(12) United States Patent
Bickerstaff et al.

(10) Patent No.: US 11,277,603 B2
(45) Date of Patent: Mar. 15, 2022

(54) HEAD-MOUNTABLE DISPLAY SYSTEM

(71) Applicant: Sony Interactive Entertainment Inc., Tokyo (JP)

(72) Inventors: Ian Henry Bickerstaff, London (GB); Hidehiko Morisada, Tokyo (JP); Tomohiro Oto, Tokyo (JP); Andrew Damian Hosfield, London (GB); Nicola Orrù, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 84 days.

(21) Appl. No.: 16/650,046

(22) PCT Filed: Sep. 19, 2018

(86) PCT No.: PCT/GB2018/052671
§ 371 (c)(1),
(2) Date: Mar. 24, 2020

(87) PCT Pub. No.: WO2019/063976
PCT Pub. Date: Apr. 4, 2019

(65) Prior Publication Data
US 2020/0296354 A1    Sep. 17, 2020

(30) Foreign Application Priority Data
Sep. 26, 2017 (GB) ..................... 1715555

(51) Int. Cl.
*H04N 13/344* (2018.01)
*H04N 13/279* (2018.01)
(Continued)

(52) U.S. Cl.
CPC ....... *H04N 13/344* (2018.05); *G02B 27/0093* (2013.01); *G02B 27/0172* (2013.01);
(Continued)

(58) Field of Classification Search
CPC .. H04N 13/128; H04N 13/279; H04N 13/332; H04N 13/344; H04N 13/383;
(Continued)

(56) References Cited

U.S. PATENT DOCUMENTS 5,880,711 A     3/1999  Tamada
10,559,019 B1 *  2/2020  Beauvais ............. G06T 19/006
(Continued)

FOREIGN PATENT DOCUMENTS

| EP | 1731943 A1 | 12/2006 |
| EP | 3070513 A1 | 9/2016 |
| EP | 3171592 A1 | 5/2017 |

OTHER PUBLICATIONS

International Search Report and Written Opinion for corresponding PCT Application No. PCT/GB2018/052671, 19 pages, dated Feb. 14, 2019.
(Continued)

*Primary Examiner* — Prabodh M Dharia
(74) *Attorney, Agent, or Firm* — Matthew B. Dernier, Esq.

(57) ABSTRACT

Methods and apparatus for generating stereoscopic images for display with respect to a virtual display screen (VDS) include: setting a VDS position for displaying a stereoscopic image of an object in a virtual scene, the VDS having a depth profile that approximates a depth profile of the object; generating the stereoscopic image for display at the VDS within the virtual scene; and controlling a configuration of the VDS based on the detected change in the viewpoint of the stereoscopic image by the viewer.

15 Claims, 25 Drawing Sheets

(51) Int. Cl.
*H04N 13/128* (2018.01)
*H04N 13/383* (2018.01)
*H04N 13/398* (2018.01)
*G02B 30/52* (2020.01)
*G02B 30/34* (2020.01)
*G02B 27/00* (2006.01)
*G02B 27/01* (2006.01)
*H04N 13/332* (2018.01)

(52) U.S. Cl.
CPC ............ *G02B 30/34* (2020.01); *G02B 30/52* (2020.01); *H04N 13/128* (2018.05); *H04N 13/279* (2018.05); *H04N 13/332* (2018.05); *H04N 13/383* (2018.05); *H04N 13/398* (2018.05); *G02B 2027/014* (2013.01); *G02B 2027/0129* (2013.01); *G02B 2027/0134* (2013.01)

(58) Field of Classification Search
CPC ...... H04N 13/398; G02B 30/34; G02B 30/52; G02B 30/0093; G02B 30/0172
USPC ................................. 345/8; 348/43
See application file for complete search history.

(56) References Cited

U.S. PATENT DOCUMENTS

| | | | |
|---|---|---|---|
| 2010/0157433 A1 | 6/2010 | Mukawa | |
| 2012/0019528 A1 | 1/2012 | Ugawa | |
| 2012/0229604 A1* | 9/2012 | Boyce | H04N 13/194 348/43 |
| 2014/0009636 A1 | 1/2014 | Lee | |
| 2016/0232710 A1 | 8/2016 | Herman | |
| 2016/0234482 A1* | 8/2016 | Bickerstaff | H04N 13/239 |
| 2016/0327790 A1 | 11/2016 | Kasano | |
| 2017/0316605 A1* | 11/2017 | Herman | G02B 27/017 |
| 2018/0003981 A1* | 1/2018 | Urey | A61B 3/032 |
| 2019/0011621 A1* | 1/2019 | Karafin | H04N 13/344 |

OTHER PUBLICATIONS

Combined Search and Examination Report for corresponding GB Application No. GB 1715555.7, 5 pages, dated Mar. 6, 2018.

* cited by examiner

| Stereoscopic Video Content 4010 | VDS Position Information 4020 | VDS depth Profile information 4030 | VDS configuration information 4040 | Additional Metadata 4050 |

HEAD-MOUNTABLE DISPLAY SYSTEM

BACKGROUND

Field of the Disclosure

This disclosure relates to head-mountable display systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 40 schematically illustrates a stereoscopic video signal.

DESCRIPTION OF THE EMBODIMENTS

Figure 1:
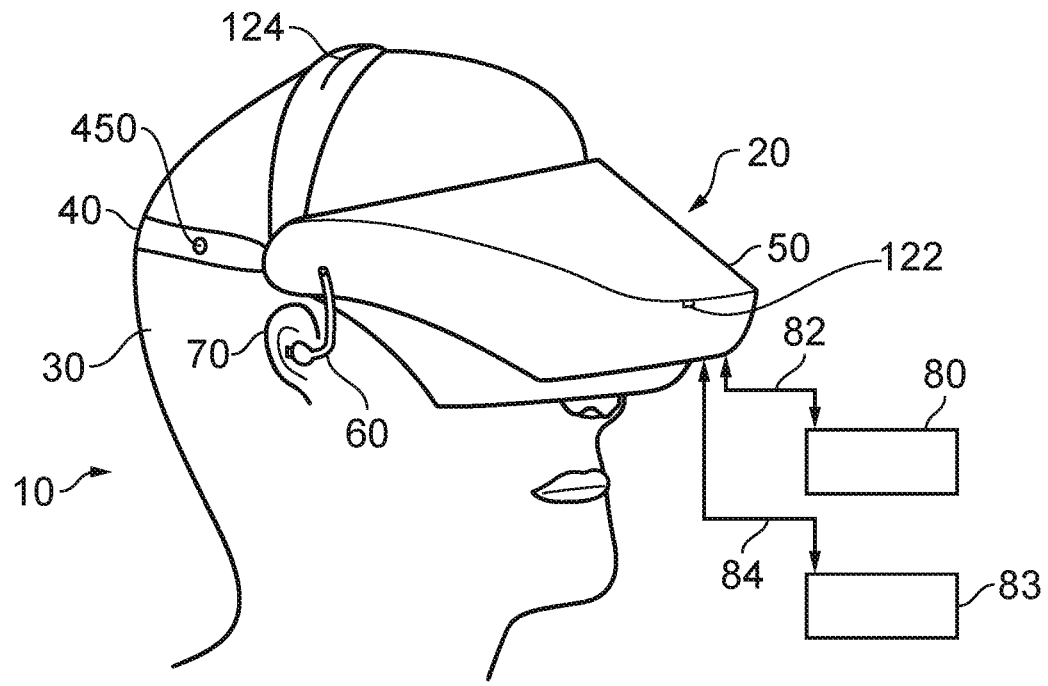
FIG. 1 schematically illustrates an HMD worn by a user.

Referring now to FIG. 1, a user 10 is wearing an HMD 20 (as an example of a generic head-mountable apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply or its own power supply; or (d) an HMD having a wireless connection to a video and/or audio signal source and a cabled connection to a power supply or its own power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
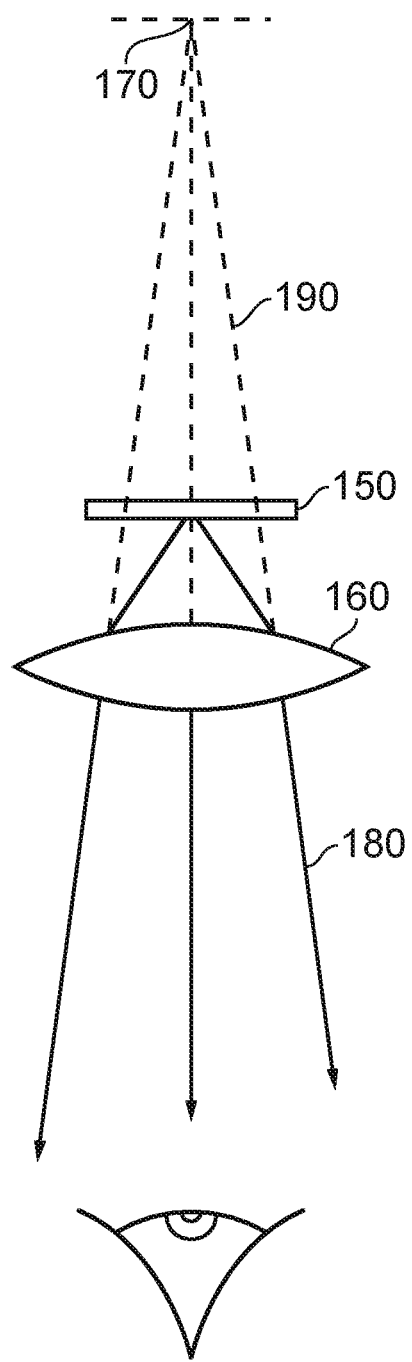
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
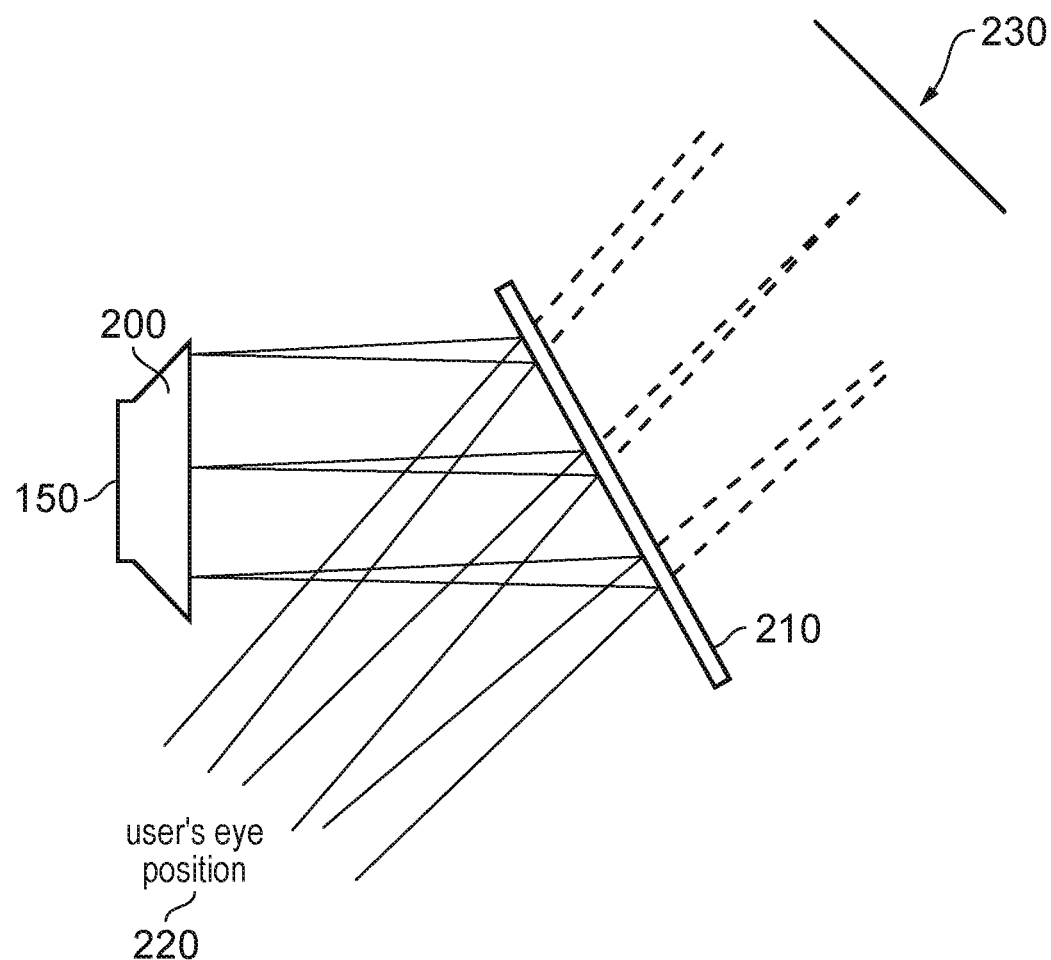
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
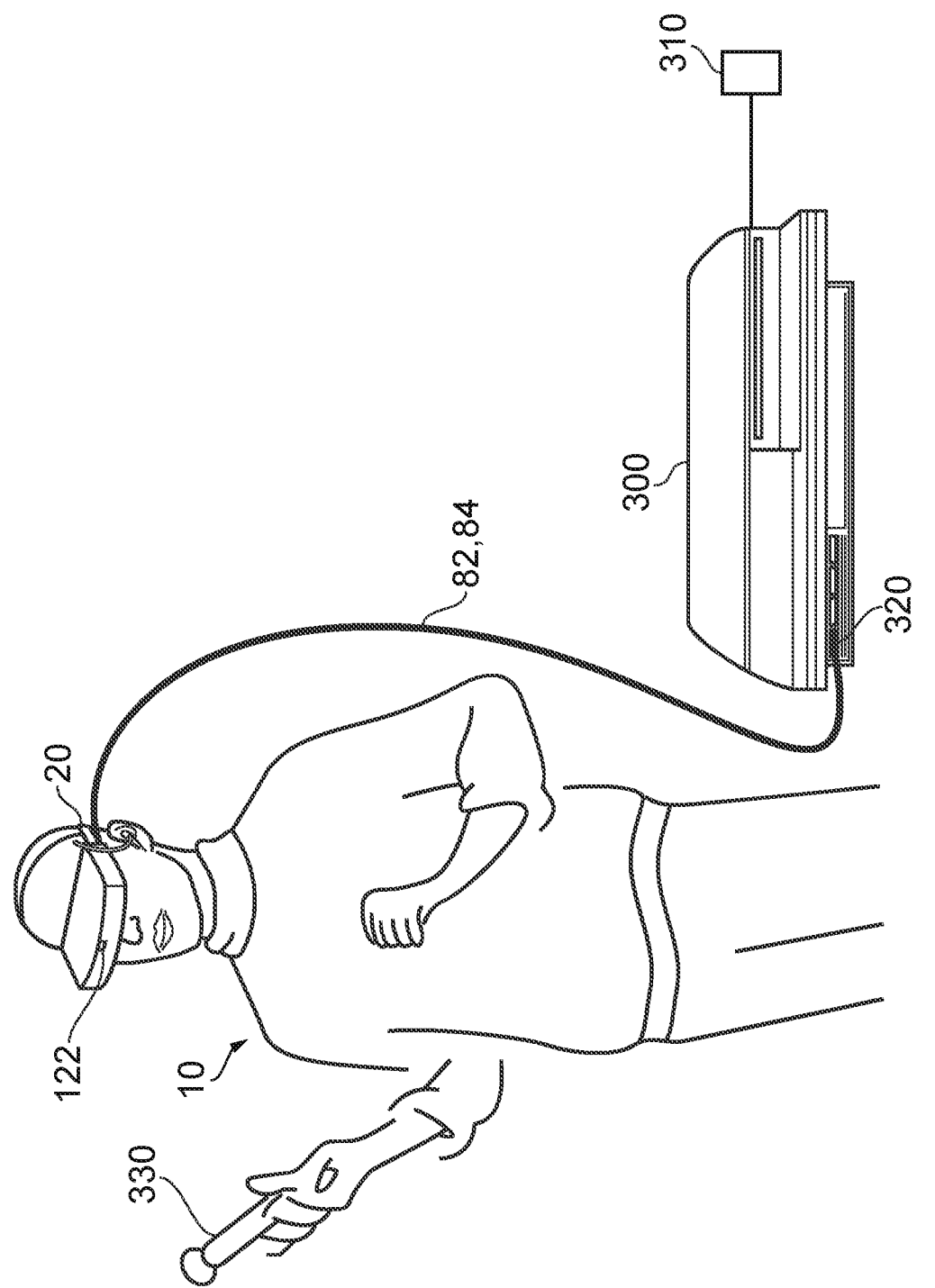
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
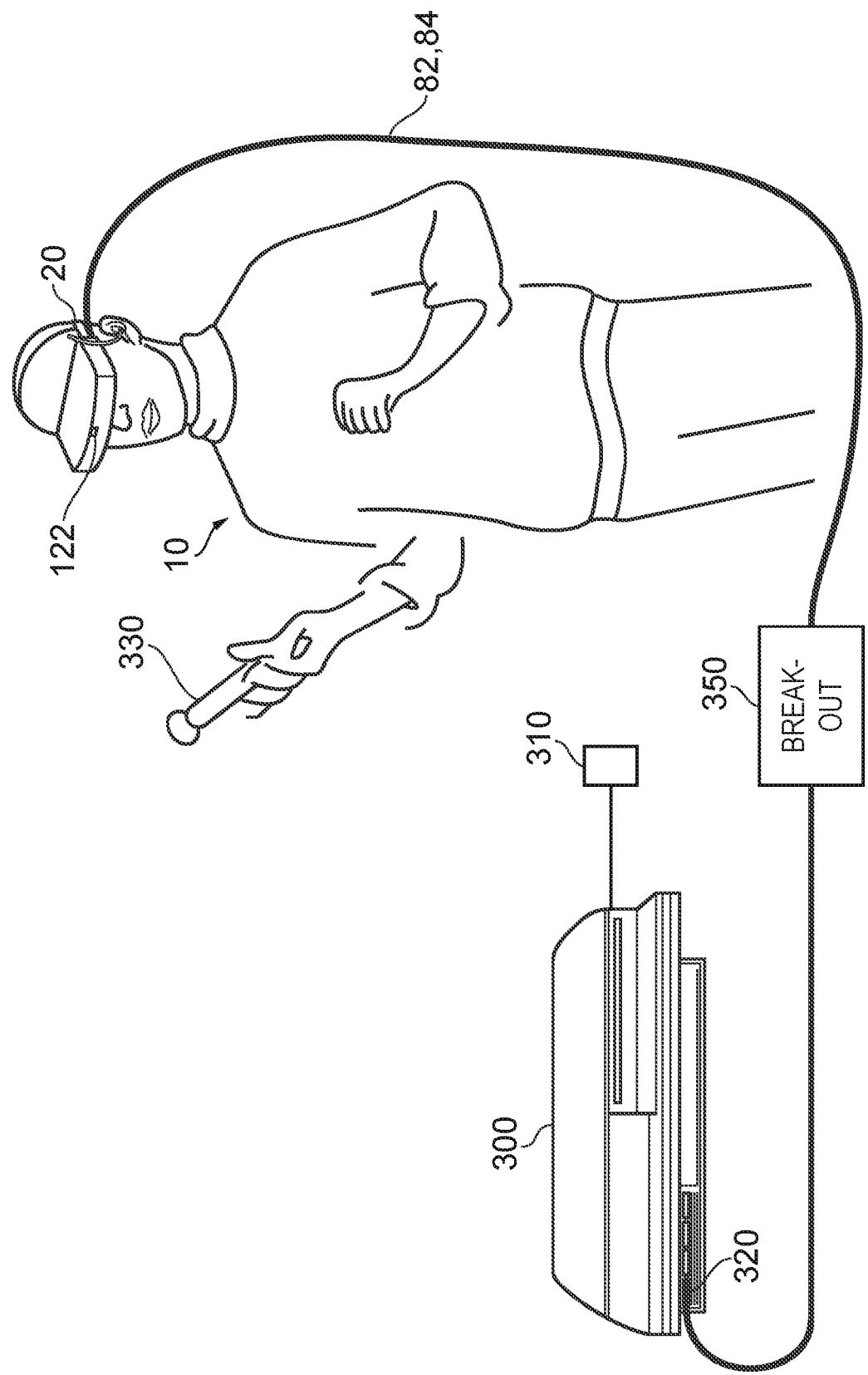

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
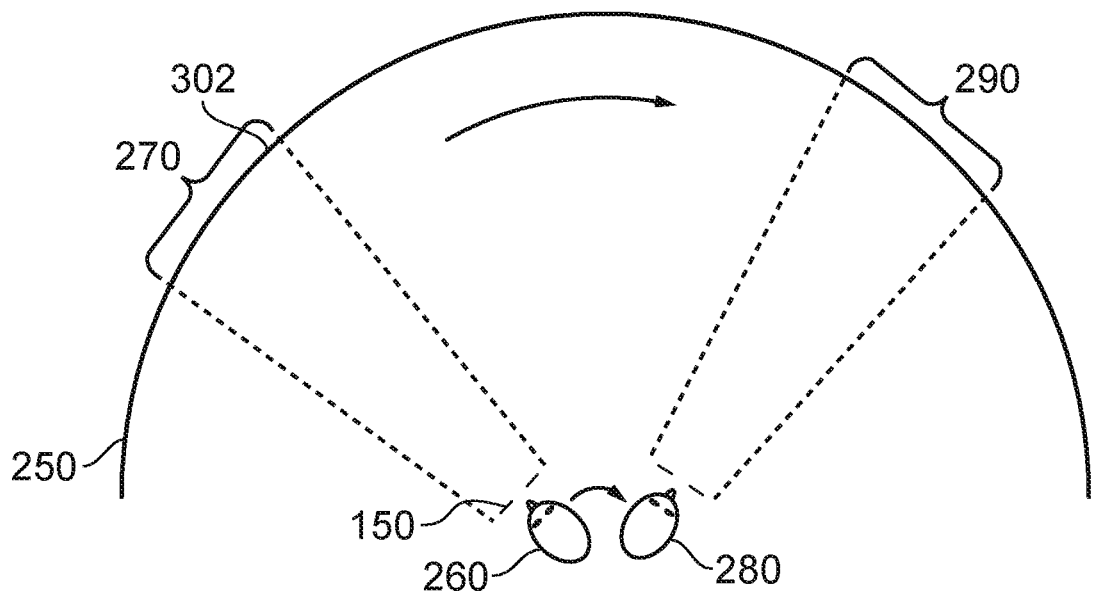
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
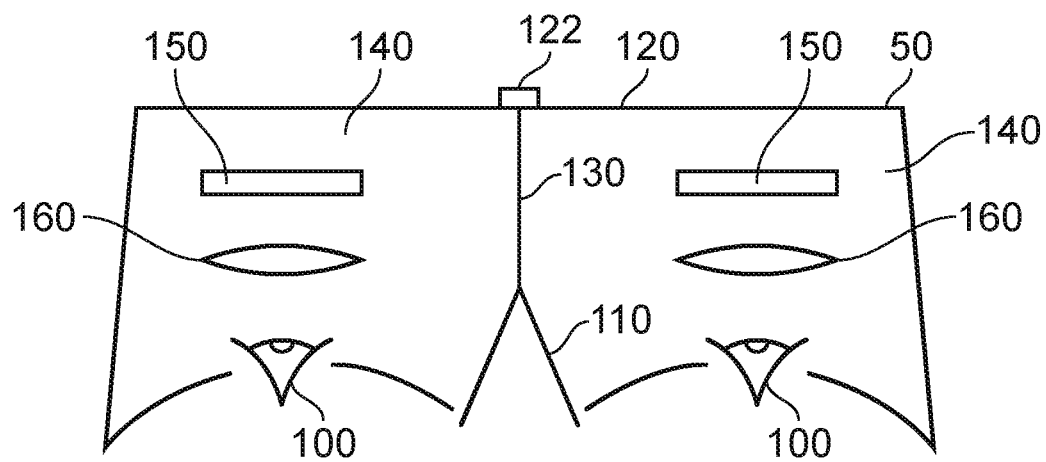
FIG. 2 is a schematic plan view of an HMD.
Figure 9A:
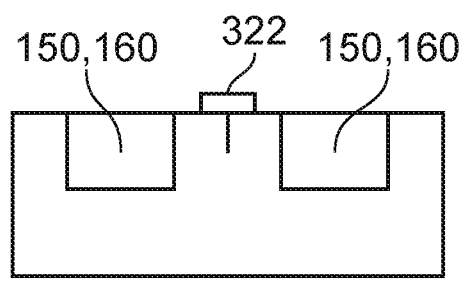
FIGS. 9a and 9b schematically illustrate HMDs with motion sensing.
Figure 9B:
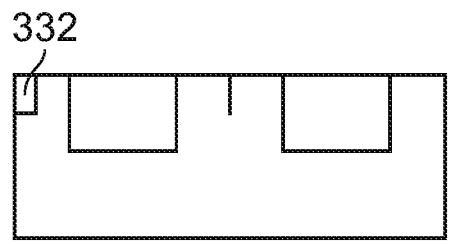

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
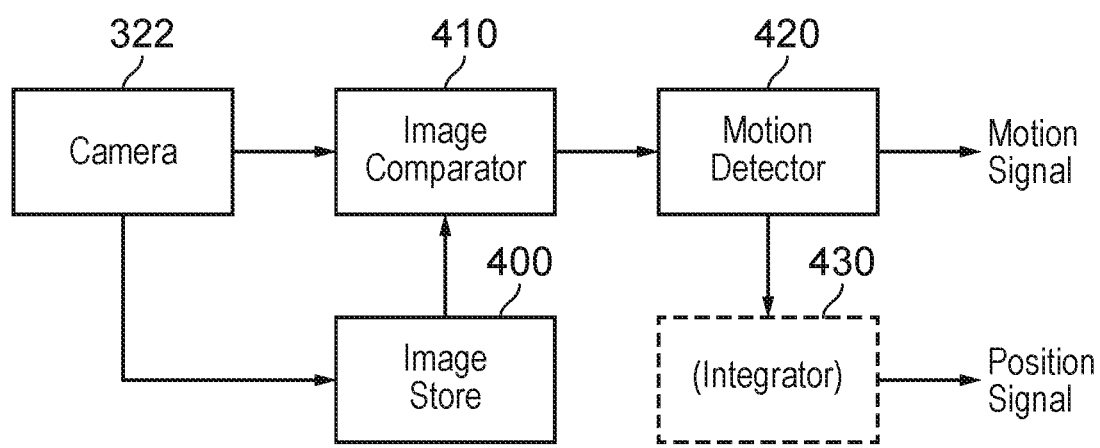
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
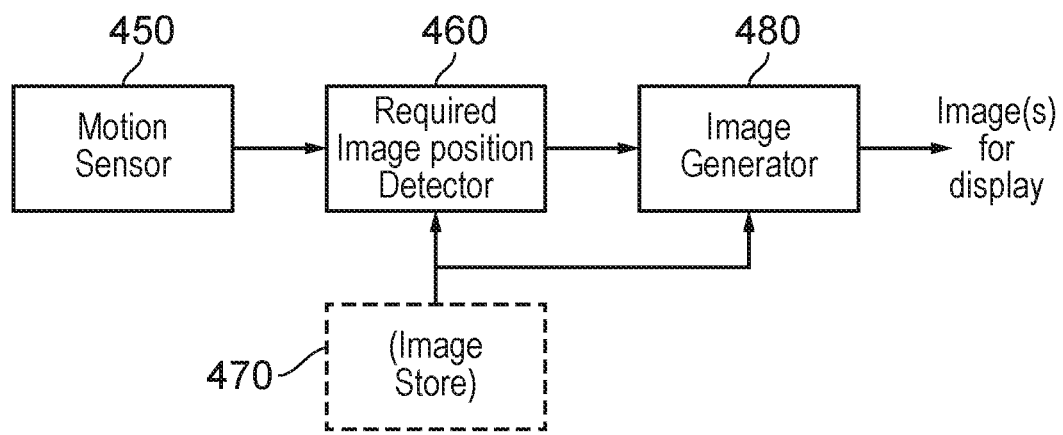
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
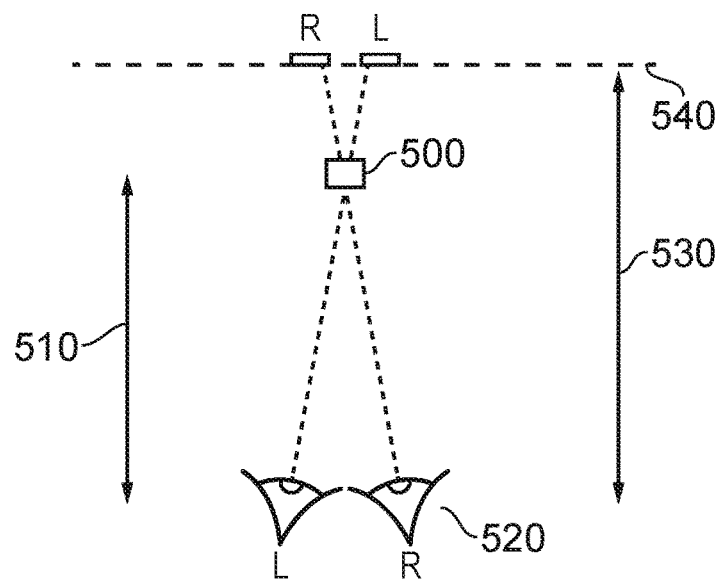
FIGS. 12 to 14 schematically illustrate the relationship between the presentation of apparent depth in a 3D representation of an object.
Figure 13:
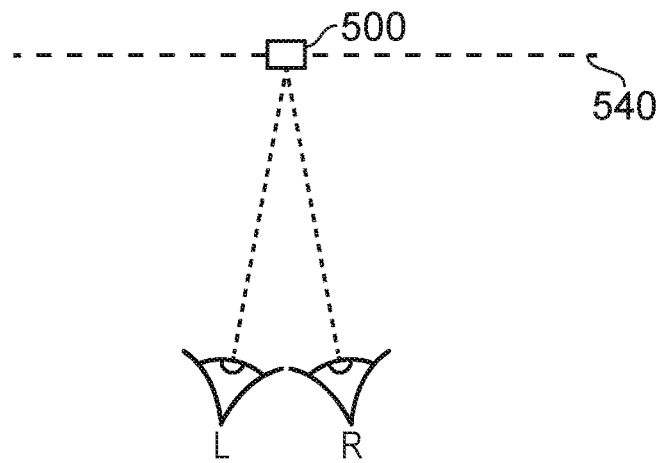
Figure 14:
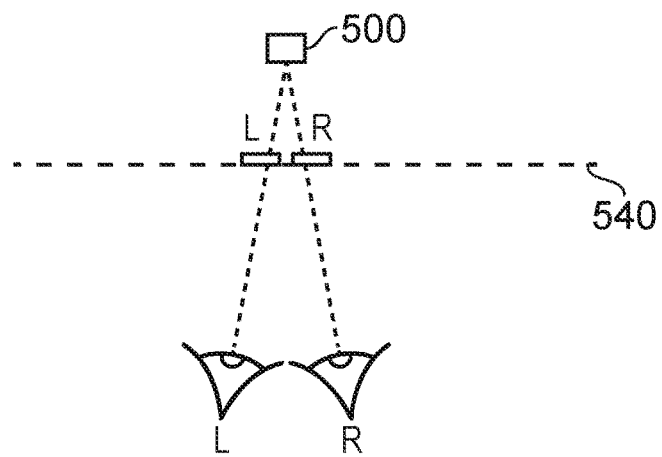

FIGS. 12-14 schematically illustrate the relationship between the presentation of apparent depth in a 3D representation of an object 500 at a distance 510 from the viewer's eyes 520 and the separation 530 of a display screen position 540 from the viewer's eyes.

In each of FIGS. 12-14 the object 500 is at the same distance 510 from the viewer's eyes but the separation of the display screen position 540 from the viewer's eyes varies between the three drawings.

The ideal separation of the display screen from the viewer depends upon properties of the camera system by which a 3D image is captured, and in particular relates to the distance from the camera of a so-called zero disparity point (ZDP), which is a position with respect to the camera at which the optical axes of the left and right image cameras converge. For an authentic representation of a 3D scene, the display screen should be placed at the same distance from the viewer as the ZDP of the camera system. So the two aspects are inter-related in that the convergence of the cameras can be set to provide a ZDP at a distance corresponding to the expected viewer-to-screen separation. For example, in the case of 3D material prepared for display on a television set, a typical viewer-to-television set distance may be assumed.

Referring to FIG. 12, the position of the object 500 to be represented is in front of the display screen position 540. In order to provide a 3D representation of the object 500, respective left and right ("L" and "R") images (together forming a respective stereoscopic image for display) are displayed on the display screen with a parallax depending on the depth of the object to be displayed. In order to represent an object in front of the display screen (which is the situation for the object 500 in FIG. 12), the parallax of the left and right images is reversed, which is to say that the left image is displayed to the right side of the right image. When the left image is viewed by the left eye only and the right image is viewed by the right eye only the impression given to the viewer is that of an object 500 at the distance 510 from the viewer, or in other words in front of the display screen.

FIG. 13 schematically illustrates the situation where the object 500 is at the same distance from the viewer as the display screen position 540. Here, there is no parallax or disparity between the left and right images of that object 500.

FIG. 14 schematically illustrates the situation where the object 500 is behind the position of the display screen (which is to say, further away from the viewer than the display screen position). In this situation, disparity is again used to provide the 3D representation of the position in space of the object 500, but in contrast to FIG. 12, the left and right images are not reversed with respect to one another, which is to say that the left image is displayed to the left side of the right image.

Overall, it can be seen from FIGS. 12-14 that, for an identical viewer position and an identical viewer-object 500 distance (510), the object 500 can be represented on a 3D display using various different display screen positions. Note that each of FIGS. 12-14 can provide an authentic and correct representation of the depth 510 of the object 500. The aspects which vary between FIGS. 12, 13 and 14 are the viewer-to-screen separation and (in a related way) the disparity, which is to say, the left-right separation (and separation direction) of the left and right images. If the object 500 is in front of the display screen, the left and right images are displayed with disparity but in a reverse direction. If the object 500 is at the same separation as the display screen, there is no disparity in the left and right images of the object 500. If the object 500 is behind the display screen, the left and right images are displayed with disparity.

In the example mentioned above, the images were captured using a camera system in which the separation from the viewer (or from the camera) of the ZDP was defined by the convergence of the optical axes of the left and right cameras. In the examples to be discussed below, however, the separation of the ZDP from the viewer can be changed. Some examples relate to computer-generated images in which the position of the ZDP can be altered during generation of the images, but other examples to post-processing of captured or previously generated 3D images in order to vary the location of the ZDP.

Changing the position of a 3D display screen has particular significance in the context of head mountable displays (HMDs). In the context of a conventional (non-HMD) display screen such as a television set or a cinema screen, it is not particularly practical to vary the separation of the user and the display screen, particularly during presentation of a piece of content. But an HMD can make use of a "virtual display screen" position such that the separation from the viewer of the virtual display screen can be altered dynamically during presentation of a content item. FIGS. 15-18 provide a discussion of potential reasons, which have been recognised as part of the present disclosure, for why a variation of a viewer-virtual screen distance may be useful.

Figure 15:
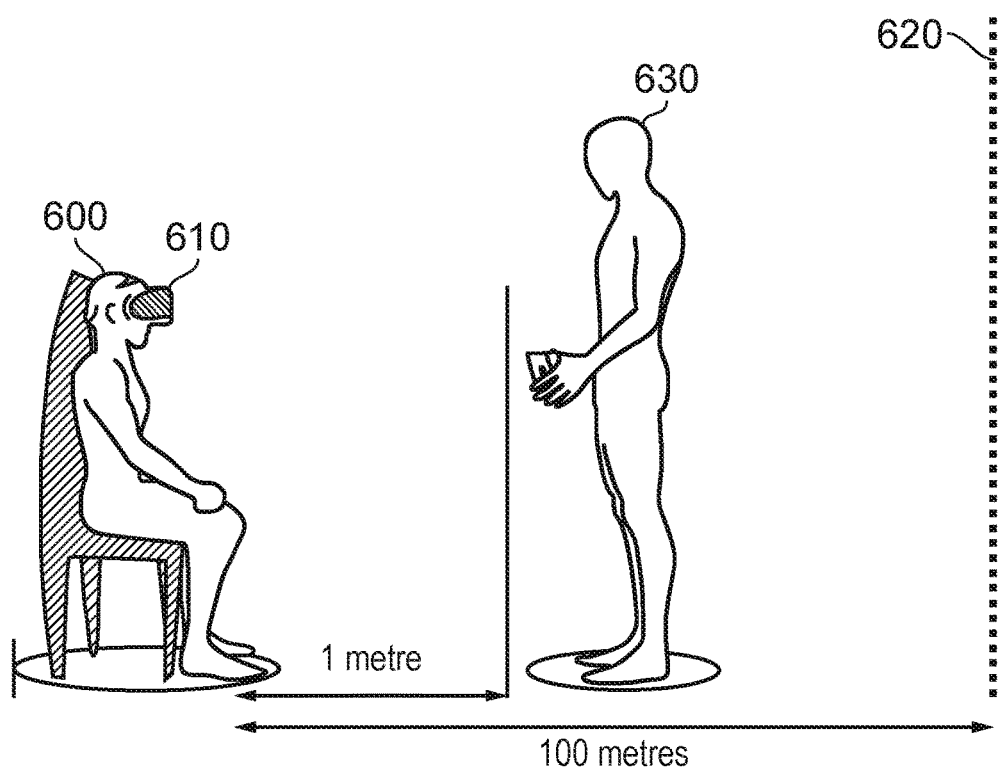
FIG. 15 provides a schematic example of a viewer wearing an HMD by which a virtual 3D display screen is displayed.

FIG. 15 provides a schematic example of a viewer 600 wearing an HMD 610 by which a virtual 3D display screen 620 is displayed. The virtual display screen is a virtual version of the display screen as discussed in connection with FIGS. 12-14. It is referred to as "virtual" because it does not physically exist in space, but rather is created or simulated optically by the operation of the HMD displays. But in other respects it fulfils the same function as the display screen discussed in connection with FIGS. 12-14. The mechanism by which a 3D virtual display screen is provided will be discussed further below. Note that as mentioned earlier, the virtual display screen subsists in three dimensional space (in a virtual sense) around the position in space of the HMD wearer, such that the HMD wearer sees a current portion of VDS according to the HMD orientation. The virtual display screen may be planar, part-spherical, curved or another shape.

For the sake of the example of FIG. 15, assume that the virtual display screen 620 is at an apparent distance of 100 metres from the viewer 600 (and is correspondingly very large). The 3D display arrangement is used to display an image of a character 630 at (for the sake of this example) 1 metre from the viewer 600. The character 630 is drawn at a position representing its apparent display position to the HMD wearer 600, but of course the character does not literally exist at that position in a physical form.

Figure 16:
FIG. 16 provides a schematic example of image disparity.

As discussed above with reference to FIG. 12, the character 630 is in front of the display screen position and so the left and right images of the character 630 exhibit left-to-right disparity in which the left eye image is displaced to the right side of the right eye image. FIG. 16 provides a schematic example of this disparity 640.

Again, as discussed above with reference to FIGS. 12-14, it is of course fully possible to display the character 630 in front of the display screen 620 using the correct amount of left-to-right disparity in the left and right images.

Figure 17:
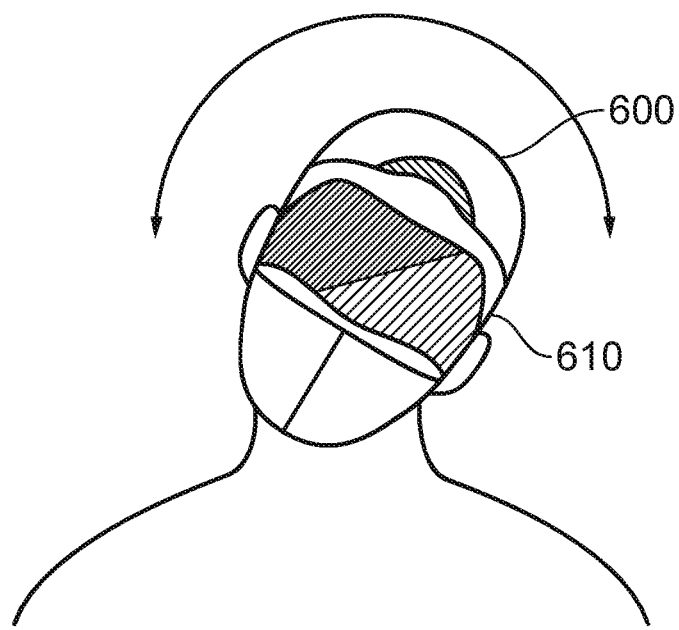
FIG. 17 schematically illustrates a tilted head.
Figure 18:
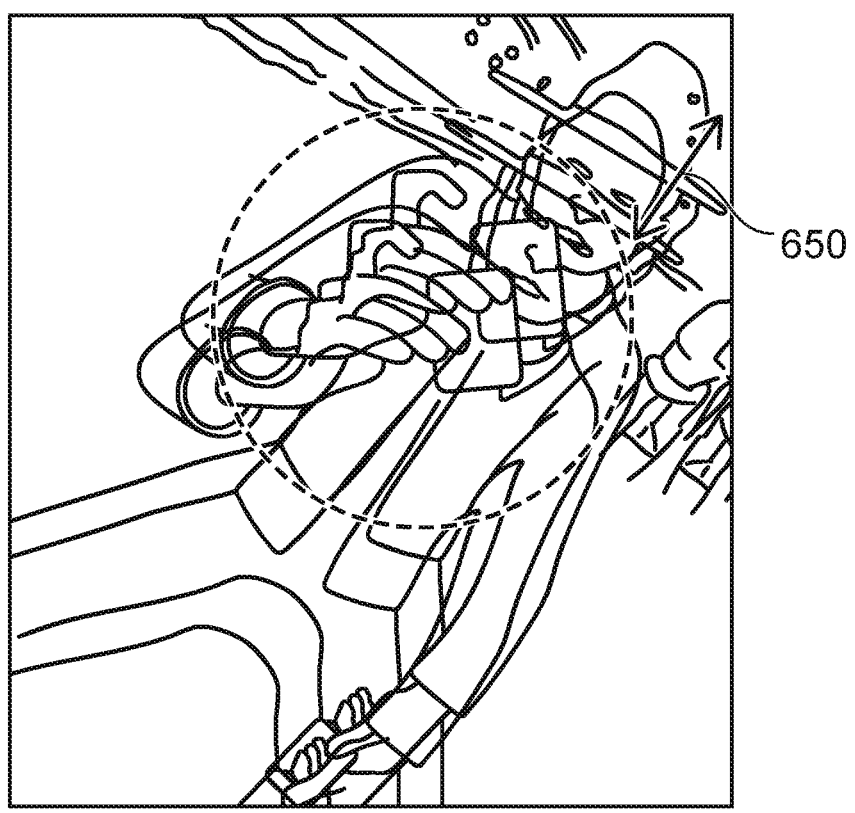
FIG. 18 schematically illustrates an example of a vertical component of parallax.

A particular problem, relevant primarily to HMDs, is illustrated in FIGS. 17 and 18. The problem arises in a situation in which the user tilts his or her head to one side or the other. A tilted head is shown schematically in FIG. 17. Now, the parallax in the video no longer corresponds with the viewer's eye orientation. The viewer sees vertical components of the parallax and the image is subjectively uncomfortable to view. An example of a vertical component of parallax is illustrated schematically as parallax 650 in FIG. 18.

A solution provided by the present disclosure is to adjust the parallax in the displayed images using (for example) a horizontal image translation so that the main image subject or region of interest (in this example, the character 630) has zero parallax. This will also lead to a corresponding but opposite change to parts of the image having a depth position different to that of the main subject. In order to provide a correct representation of the 3D scene, the virtual display screen 620 is also moved so that its separation from the viewer 600 is the same as that of the subject 630. Accordingly, the display of the character 630 is changed from the situation of FIG. 12 to the situation of FIG. 13 by the two operations of (a) moving the position of the display screen (in this case, a virtual display screen) to the depth of the character 630 and (b) altering the parallax of displayed items to suit the new display screen position. This arrangement allows the viewer to be able to tilt his or her head and maintain a comfortable 3D view of the subject 630, as shown schematically in FIG. 19. In FIG. 20, a card 660 held by the character 630 exhibits zero parallax.

Figure 19:
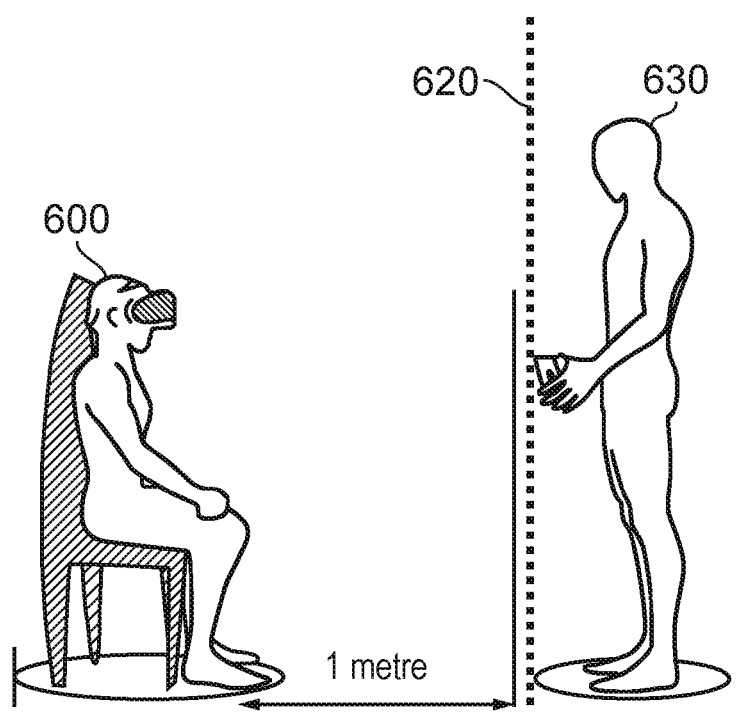
FIG. 19 schematically illustrates a virtual display screen repositioned to align with an object or region of interest.
Figure 20:
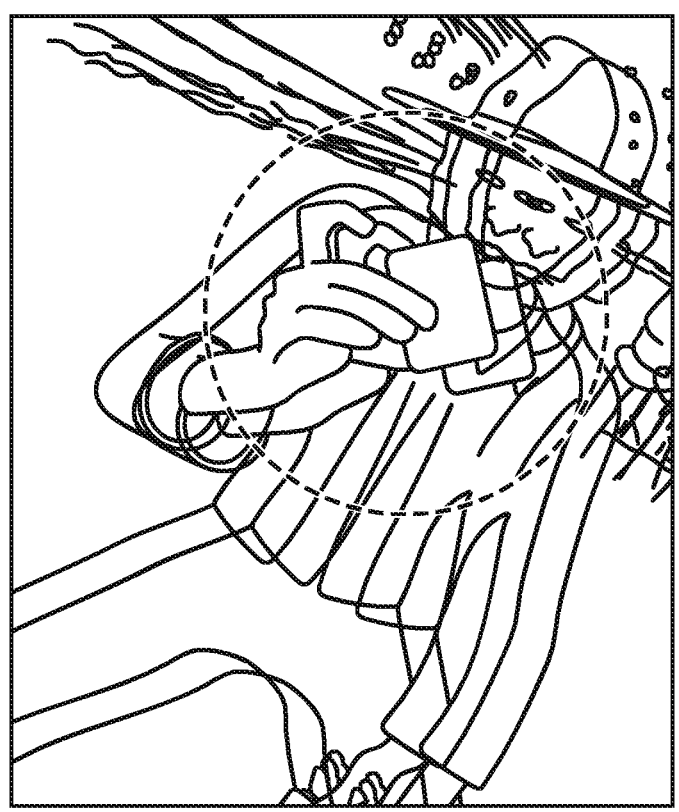
FIG. 20 provides a schematic example of image disparity.

Comparing FIG. 19 with FIG. 15, note that when the viewer's head is horizontal, the 3D image will appear entirely identical between the two situations. In other words, when the head is horizontal, there is no difference between the version with the virtual screen at 100 metres from the viewer and the version with the virtual screen 1 metre from the viewer. Both arrangements provide an equally authentic representation of the 3D scene. But if the user tilts his or her head during viewing, the version of FIG. 19 with the virtual screen at the same distance (or substantially the same distance) from the viewer as the main region of interest in the displayed content, will be subjectively much more comfortable to view.

Figure 22:
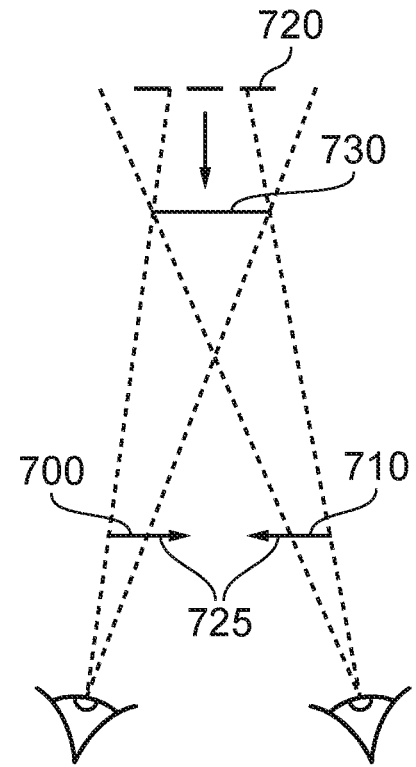
Figure 23:
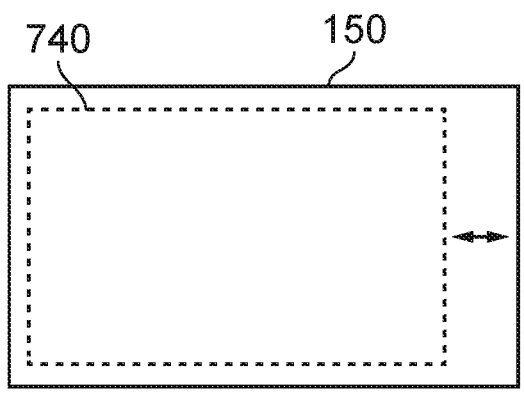
Figure 23:
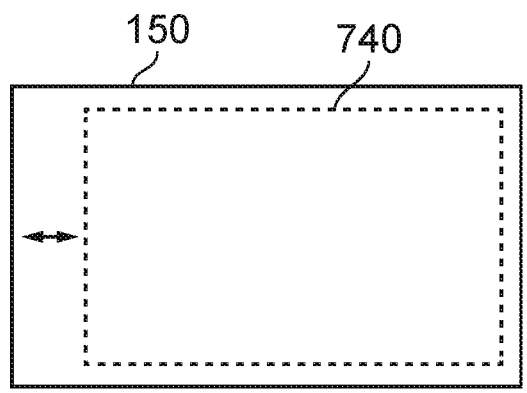

Techniques for changing the parallax of a 3D image for display will be discussed below. First, however, FIGS. 21-23 schematically illustrate the generation of a virtual display screen in an HMD.

Referring back to FIG. 3, in the context of an HMD it is possible even with display devices which are physically very close to the user's eye to give the impression of a virtual image some considerable distance from the user. This is important for user comfort, because even if the user could focus his eyes on a display device a matter of a few cm from the eye (and most users simply could not do this) it would be very uncomfortable to maintain that level of close focus over a prolonged period. So, in optical terms, the virtual image provided by the display optics is at a comfortable distance from the viewer's eyes. But that discussion relates to the focus distance of the viewer's eyes. The position in space of a virtual display screen for 3D presentation can be different to the distance at which the eyes have to focus on the optical virtual image of the display devices. In fact, the separation from the user of a virtual display screen for 3D presentation depends on the bulk lateral disparity of the left and right displayed images.

Figure 21:
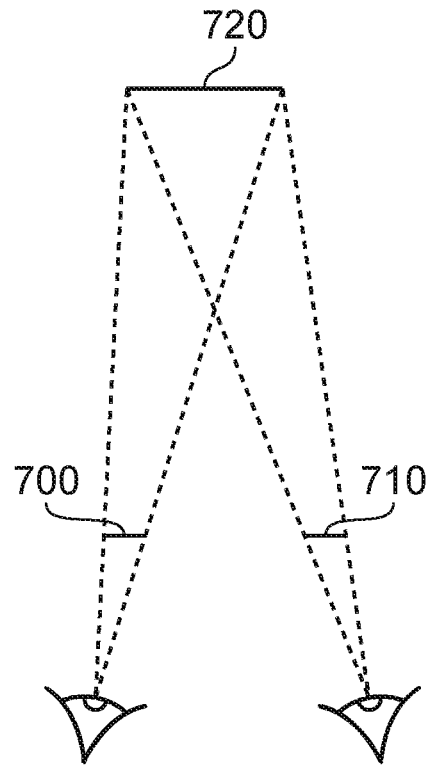
FIGS. 21 to 23 schematically illustrate the generation of a virtual display screen in an HMD.

In the example of FIG. 21, the overlay between displayed images 700, 710 for the left and right eyes gives rise to a virtual display screen position 720. In FIG. 22, the display positions of the left and right images 700, 710 are displaced slightly inwards in respective directions 725. This leads to a virtual display screen position moving towards the user to a new position 730.

So, a (potentially very slight) lateral adjustment of the position of the displayed images inwards (towards the other eye's image) brings the virtual display screen position towards the user. Lateral adjustment of the displayed image positions outwards (in a direction away from the other image) move the virtual display screen position away from the user. Note that these changes in the separation, from the user, of the virtual display screen for 3D presentation are independent of the focus distance of the eye on the optical virtual image provided by the display elements and the display optics. The focus distance can remain the same but the position, relative to the user, of the virtual display screen 720, 730 can be changed in this way.

It is possible to vary the lateral position of the displayed left and right images without any mechanical changes in the position of either the display devices 150 or the display optics 160, simply by providing display devices 150 which are slightly larger than the required size 740 of the displayed left and right images. This gives the scope to make subtle electronic changes to the position of the virtual display screen by simply laterally shifting the position, within the available display area of the display devices 150, of the displayed portion 740.

Figure 24:
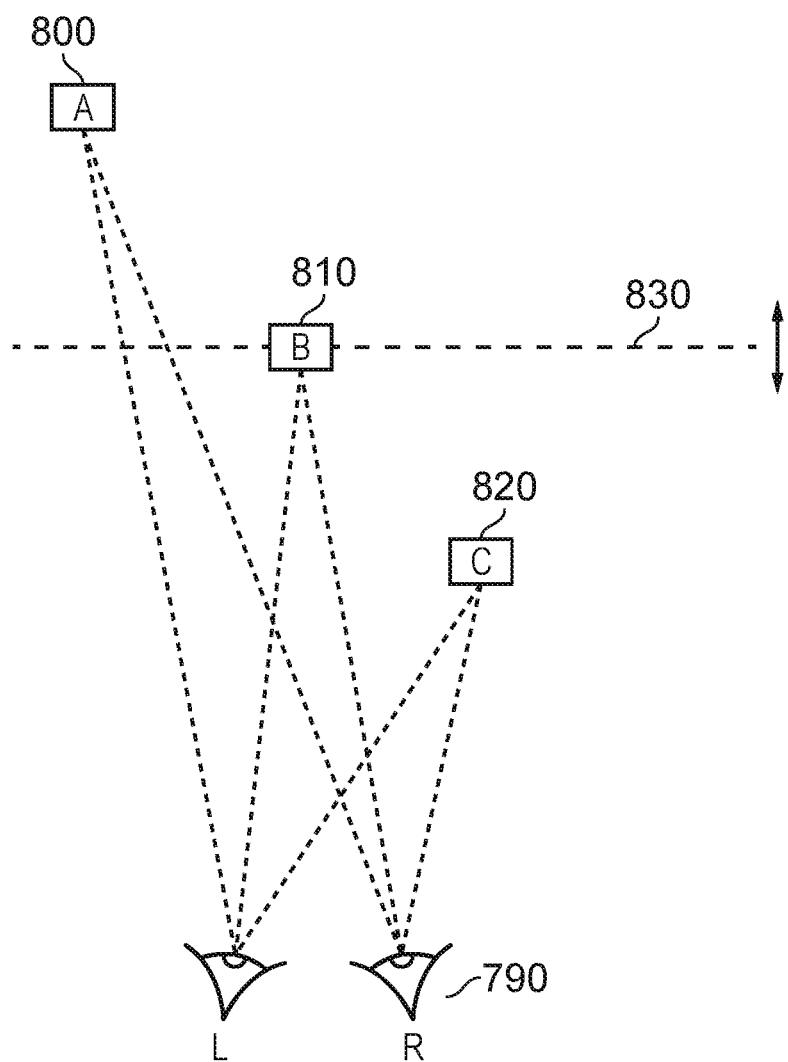
FIGS. 24 and 25 schematically illustrate the process of rendering 3D left and right images based on depth information of image features.
Figure 25:
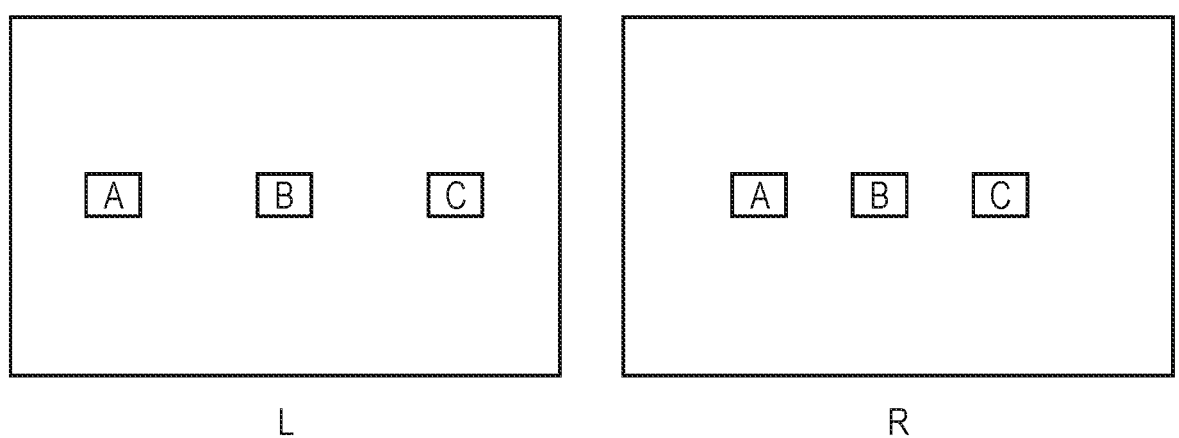

FIGS. 24 and 25 schematically illustrate the process of rendering 3D left and right images based on depth information of image features. The depth information may be provided by, for example, a depth parameter associated with pixel positions or objects for rendering. Such techniques are used in for example computer games systems in which various items relating to the ongoing progress and display of a computer game's virtual world have associated depth parameters relating to their virtual position in the virtual world.

In particular, FIG. 24 schematically illustrates left and right viewing positions 790, three example objects 800, 810, 820 at different depths and lateral positions with respect to the viewing positions 790, and the ZDP representing a virtual screen position 830. For each of the left and right images (labelled as "L" and "R" in FIG. 25) the image position of each of the objects 800 . . . 820 in the respective image is determined according to their positions as seen from the viewpoint of that eye. Example L and R images are shown in FIG. 25. In this example, the position 830 of the virtual screen coincides with the depth of the object 810 so there is zero lateral disparity between the image positions of the object 810 in the left and right images. The object 800 is behind the position 830 of the virtual screen, and so the image position of the object 800 is displaced to the left in the left image and the right in the right image. The object 820 is in front of the position 830 of the virtual screen and so the image position of the object 820 is displaced to the right in the left image and to the left in the right image.

But in general, given a ZDP location and depth parameters associated with image objects or pixels, the resulting L and R images are rendered using known techniques to provide an appropriate representation of depth when the L image is viewed by the left eye and the R image is viewed by the right eye.

While the selection of a particular VDS position in dependence upon the location of a plurality of virtual objects within a scene may provide a viewing experience that is acceptable to a viewer in many cases, there are a number of problems that may arise in such an arrangement. For example, if a viewer were to focus on object A in FIG. 24 and tilt their head then object A may not appear to move in the correct manner—as was discussed with reference to FIGS. 15-20. However, object B would be displayed correctly as it is displayed at the distance of the VDS and thus is at a ZDP.

Figure 26:
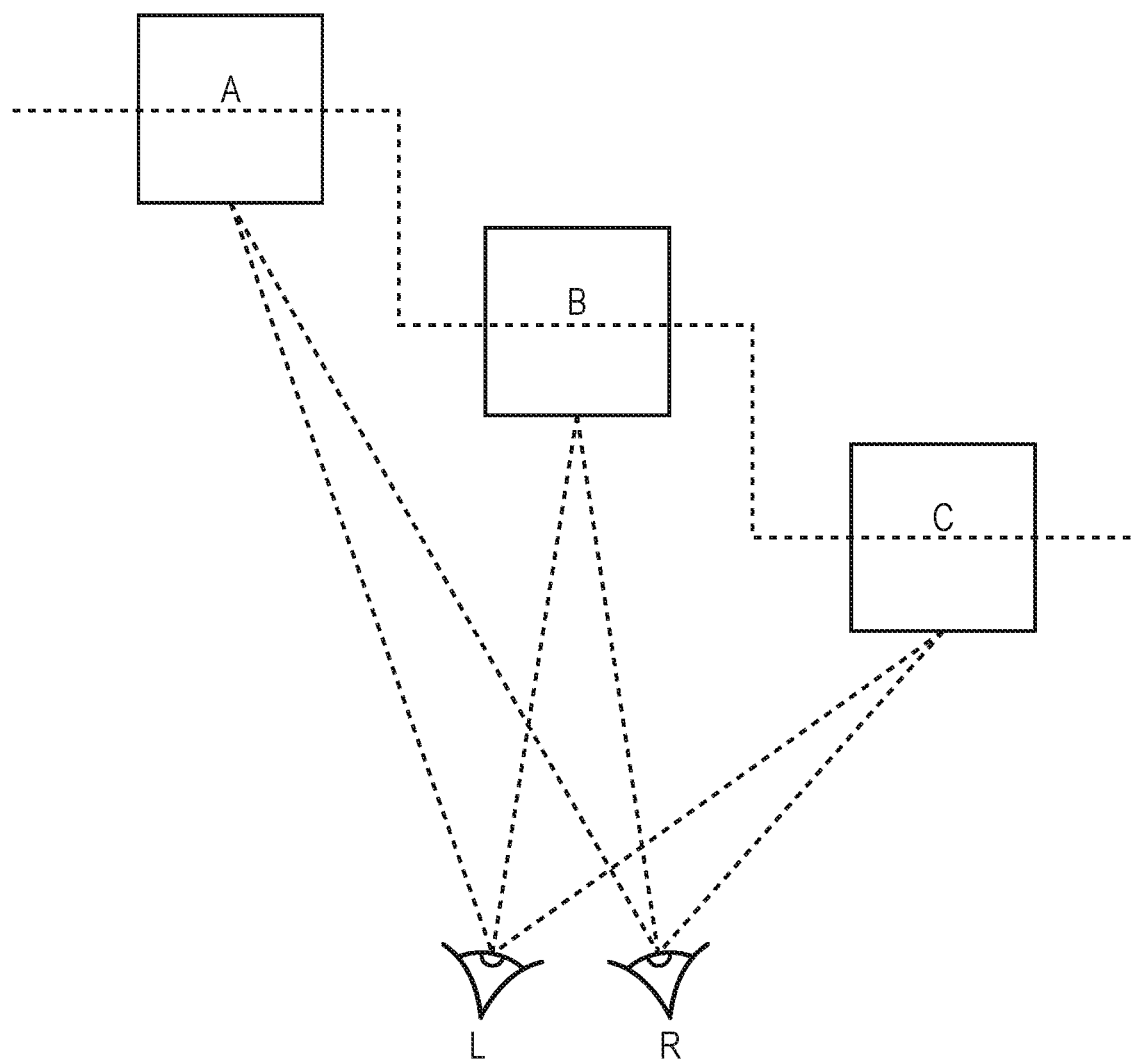
FIGS. 26 and 27 schematically illustrate a plurality of virtual objects.

FIG. 26 schematically illustrates an alternative VDS arrangement. In this arrangement, the VDS has a non-planar shape such that each of objects A, B and C are each presented at the depth of the VDS. By setting the shape and dimensions of the VDS to allow such an arrangement, the correct presentation of each of the objects may be possible even when the viewer tilts their head or the like.

By using such a VDS arrangement, the relative motion of objects as a user moves their head may appear to more closely mimic that which the user would expect from real-world experiences. While there may be some errors in the display of an object upon a change in viewpoint resulting from the shape of a VDS not exactly matching the shape of a corresponding object, the errors are generally not noticeable or significant when there is dynamic motion within the scene. Nevertheless, such an arrangement may be considered important for use in an arrangement that makes use of positional tracking.

While the VDS is illustrated as a single element in FIG. 26, it is possible that the VDS may be represented by a number of discrete elements; for example, the VDS may only comprise the portions intersecting the virtual objects, rather than also comprising the lines connecting each of these intersecting portions. It should also be noted that the VDS need not be generated so as to be mapped to the position of every object within the virtual scene; it is also considered that only a subset of the objects within the environment are used in this fashion. For example, only the objects deemed to be most relevant to the viewer or content may be considered when generating a VDS.

Figure 27:
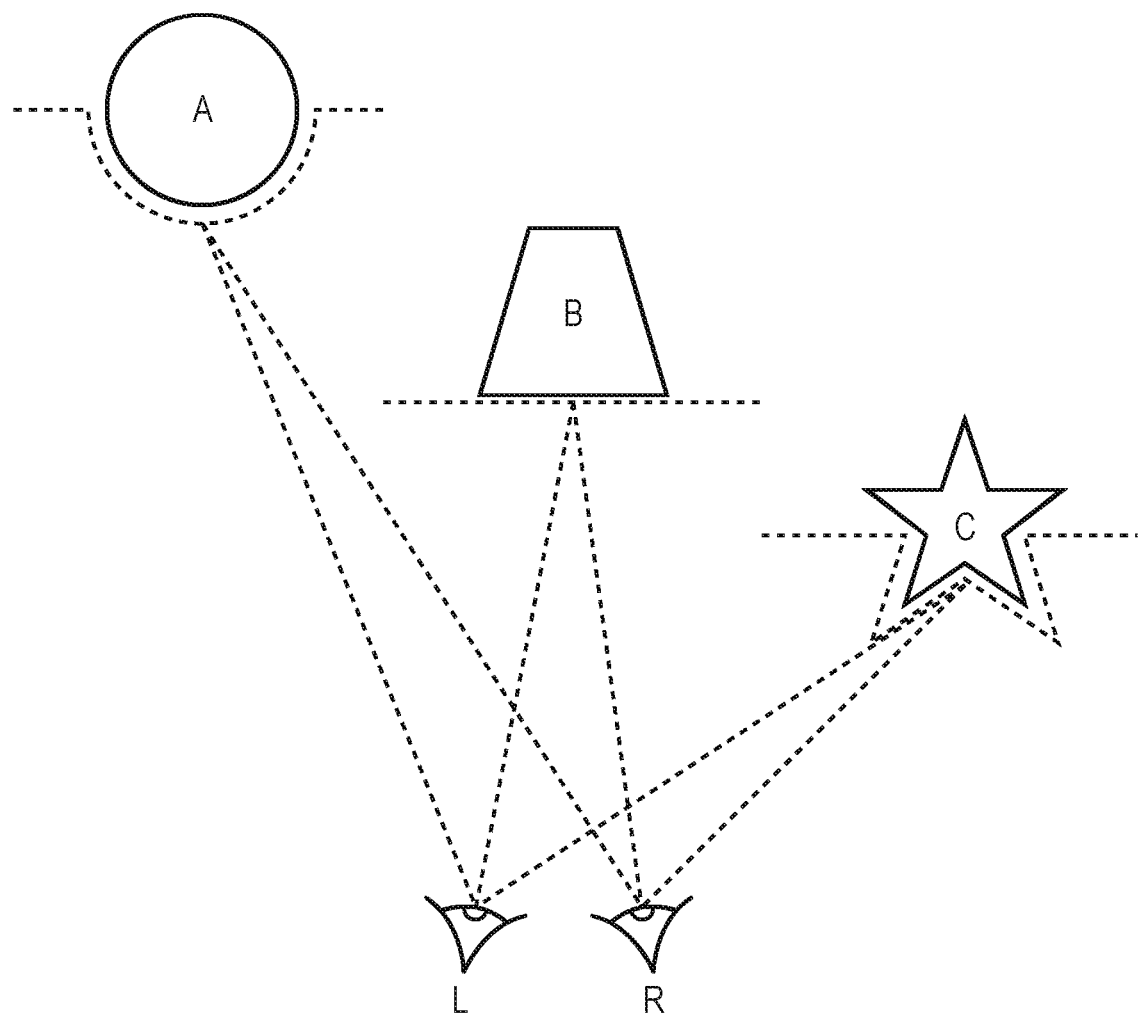

FIG. 27 schematically illustrates a plurality of VDSs that are generated so as to map to the contours of the virtual objects to be displayed. This may be performed so as to enable the correct display of each part of an object at a range of different angles; this may be particularly important if an object is shaped in such a way that the amount of parallax would vary significantly across an object. The VDS portions are shown as being slightly in front of the corresponding objects in this Figure for the purpose of clarity, although it should be appreciated that in practice the VDS would more likely be provided at the same depth as the surface of the object so as to derive a greater benefit in viewing quality.

One way in which this may be achieved is by defining a plurality of VDSs each possessing a virtual depth, with a function describing a deviation from a flat VDS—effectively, the function describes the shape of the screen with reference to a flat VDS. In such an arrangement, the depth of the VDS may be referred to as a macro-scale depth while the deviation function defines a micro-scale depth. This function may be derived using information about objects in the scene that is provided, for example in metadata or in a three dimensional model. Alternatively, or in addition, information enabling the definition of an appropriate function could be derived from disparity data either provided with the content to be displayed or derived from the content itself by image processing.

In FIG. 27, as in FIG. 26, each of the objects is defined with a corresponding VDS at a particular depth. However, a function or other form of modification to the VDS is provided such that it conforms to the shape of the object. For example, a function defining a semi-circle of a particular radius could be applied to the VDS associated with object A.

Object B, having a flat face, need not have a function applied as a line may be used; however, if the viewer's viewpoint were to change then this may no longer be the case. This is because the viewer would then be able to see the sides of the object, and thus a more complex (non-planar) surface would be presented to the viewer. Object C, having a more complex shape than objects A or B, could be approximated by a curve such as a high-order polynomial or an appropriate Fourier series; in the present example, the VDS corresponding to object C is defined using a plurality of lines.

Of course, in embodiments in which functions are not used to define the VDSs it may be possible to simply define a VDS of a particular shape using line segments or a set of discrete points or the like, or to simply derive a VDS shape using the depth information associated with each object (for example, from a disparity map or the like).

In some embodiments the use of a function is not sufficient; for example, when defining VDSs that are curved in all three dimensions. In such embodiments it may be advantageous to define a VDS as a three-dimensional object; a mesh may be particularly appropriate. The mesh could be defined in the same manner as the VDSs as described above, for example by using a plurality of functions in conjunction so as to define a surface.

It is considered that the user often may not be able to focus on each object within a scene simultaneously; in such cases, it may be possible to only provide a non-planar VDS for objects that are focussed upon (or in the immediate vicinity of the point of viewer focus) in the virtual scene. This may be implemented using a gaze tracking arrangement (such as cameras mounted within the HMD to perform eye tracking), or by using contextual information about the displayed content to infer an object of interest, for example. The provision of gaze-dependent VDSs may be advantageous in reducing processing overheads, without significantly impacting the viewing experience. For example, if the viewer were focussed on object A in FIG. 27, then both objects B and C may be represented by flat (or otherwise simplified) VDSs as the viewer would be less likely to notice any errors in the display of these objects due to not focussing on them.

Figure 28:
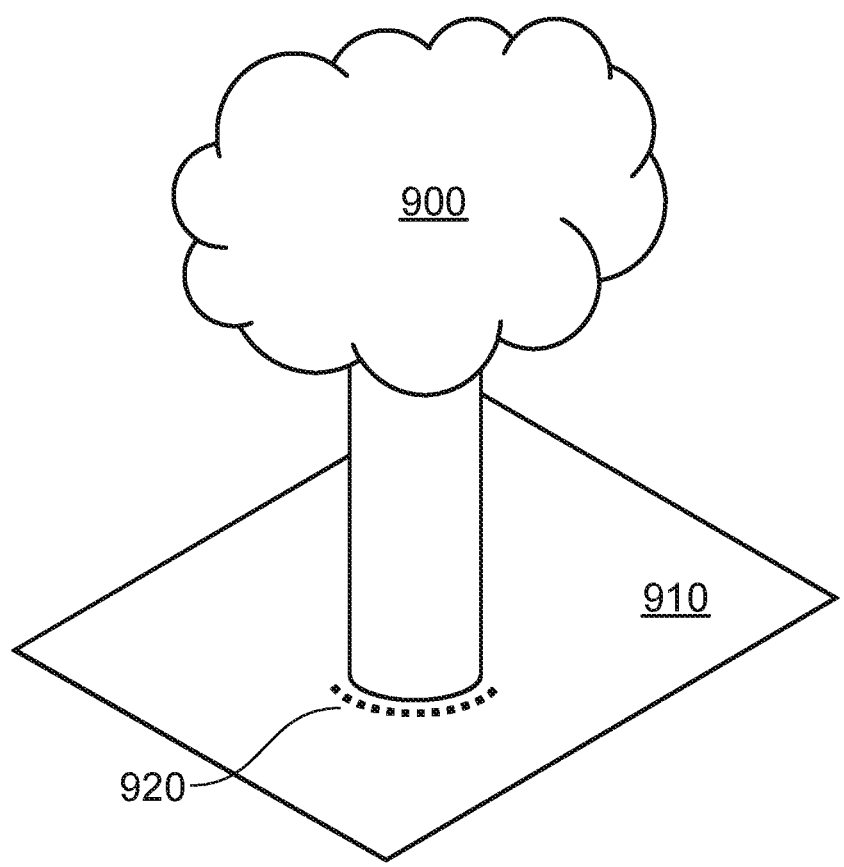
FIG. 28 schematically illustrates a virtual scene.

FIG. 28 schematically illustrates an example of a simple scene that may be viewed in such an arrangement. This scene comprises a tree 900 and a background (such as a patch of grass) 910. A VDS is defined such that there are zero disparity points 920 at the base of the tree 900.

In this arrangement, the VDS may match the shape of the tree 900 exactly (or provide a good approximation of the shape of the tree). In such a scene, it is advantageous that the contact region between the tree and the ground has zero parallax. This reduces the appearance of 'floating' that may be experienced from some angles, particularly during head rotations, as a result of different parallaxes causing even touching objects to move different in response to a change of viewpoint of the viewer. This may be applied at the contact point between any two objects in a virtual scene that is presented to the user.

In view of this consideration, it is possible that the only zero-disparity region that actually maps to the surface of the object is that of a contact point between the object and the ground (in the example of FIG. 28, the base of the tree); the rest of the object may have a disparity with respect to the corresponding VDS that is defined. This may be particularly useful in an embodiment in which the VDS is not mapped exactly to the object, instead simply approximating the object so as to reduce the complexity of VDSs. Using the example of FIG. 28, this could mean that a featureless half-cylinder could be used as the VDS, with the texture of the tree being defined as having a different depth to the VDS.

The ground, being the backdrop for the tree in this scene, may be projected onto a flat VDS behind or below the VDS associated with the tree. While the ground could be grassy, it would not be considered essential that each blade of grass is associated with an individual VDS; this would generate an unnecessary processing overhead that would provide little benefit. This is because the user is unlikely to notice any errors in displaying the grass with regards to depth or the like—the blades of grass are small and not the focus of the image.

This is an example of selectively assigning VDSs to different objects within a scene; while each object could have a corresponding VDS defined only for that object, this may not be desirable. For example, static objects within a scene are not likely to be of a great interest to a viewer and so may share a flat VDS with one or more other objects with little impact on the viewing experience that is provided.

Figure 29:
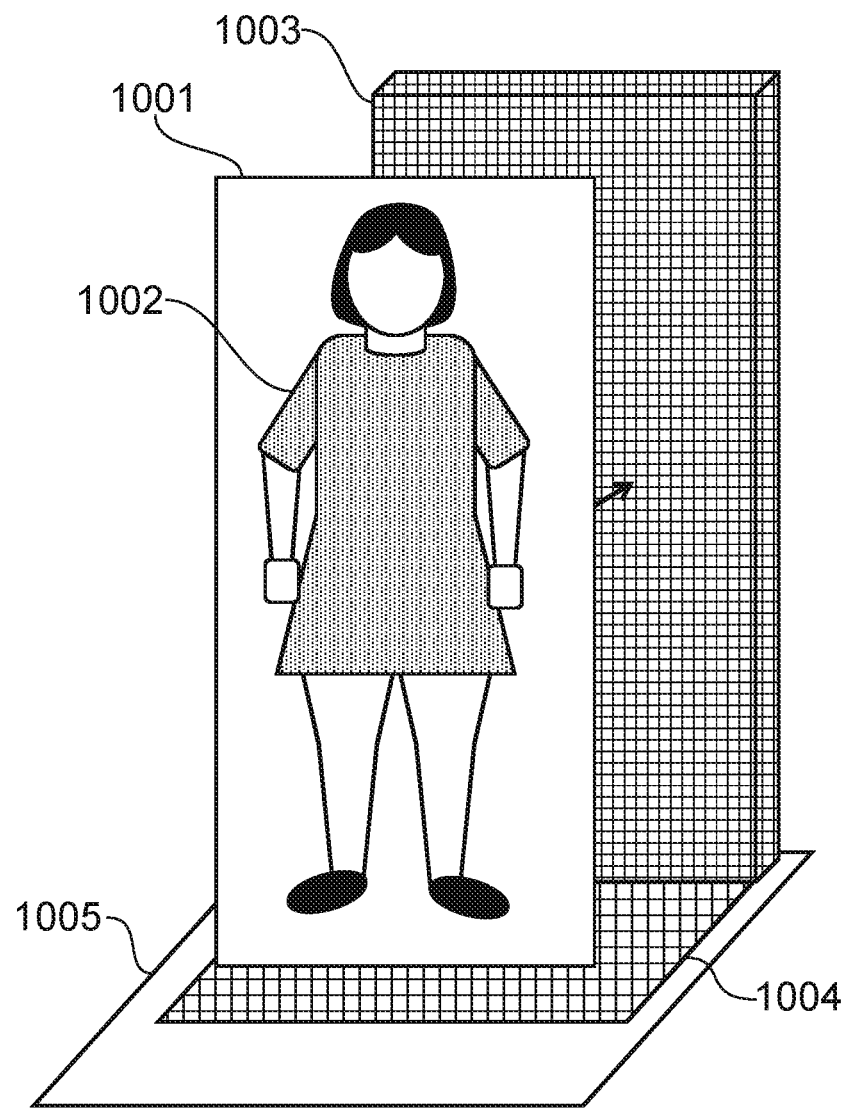
FIG. 29 schematically illustrates a stereoscopic image of a performer and a VDS onto which that image is to be projected.

FIG. 29 schematically illustrates another example of a stereoscopic image that may be displayed as part of a virtual scene. FIG. 29 shows a stereoscopic image 1001 of a person 1002 that is to be projected onto a VDS, in this case, a surface defined by a three-dimensional flat mesh 1003. In FIG. 29, the stereoscopic image is shown as a single image and as being separated from the mesh for reasons of clarity (it will be appreciated that in reality, the stereoscopic image comprises a superposition of two images). In some examples, the mesh may include a portion 1004 that conforms to the shape of a floor 1005 in the virtual scene. The mesh may be defined such that there are zero disparity points (not shown) at the point of contact between the feet of the person 1002 in the stereoscopic image and the floor 1005 of the virtual scene. As mentioned previously, this ensures that the object, in this case a person, does not appear to float when they touch the 3D geometry corresponding to the virtual scene. The stereoscopic image may be a live action video of the person performing music or acting, for example.

Figure 30:
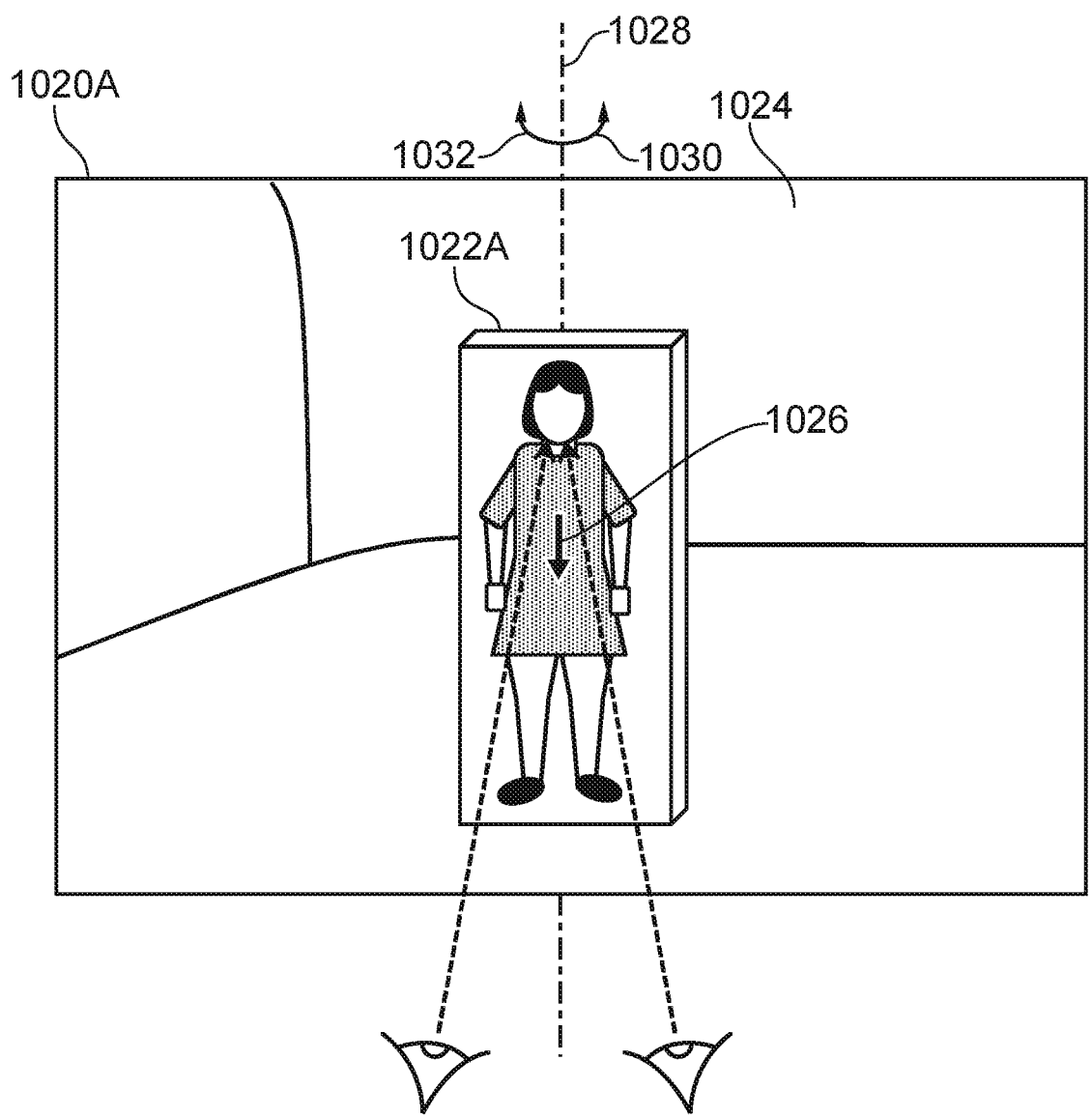
FIG. 30 schematically illustrates a virtual scene being viewed from a first viewpoint by a viewer.

FIG. 30 schematically shows an example of the stereoscopic image of a person having been projected onto a flat mesh 1022A. In FIG. 30, the mesh is shown as being positioned within a virtual scene 1024. The virtual scene may correspond to e.g. a 3D reconstruction of a recording studio in which the person in the stereoscopic image is performing. The mesh is positioned at a depth within the virtual scene that corresponds to the depth of the performer. In this example, the mesh is shown as flat and so crudely approximates the depth profile of the performer. In other examples, the shape of the mesh may be more complex where e.g. the performer comes into contact with other objects such as instruments or props, in addition to the floor of the virtual scene.

In FIG. 30 it can be seen that the eyes of a viewer of the virtual scene are directed at the performer within the virtual scene, in particular, the face of the performer. A normal vector 1026 at the surface of the mesh 1022A is also shown in FIG. 30. As can be seen in FIG. 30, the normal vector 1026 is normal to the mesh 1022A and is approximately perpendicular to the direction of the user's line of sight (i.e. their overall line of sight, as opposed to the individual gaze direction of each eye).

Figure 31:
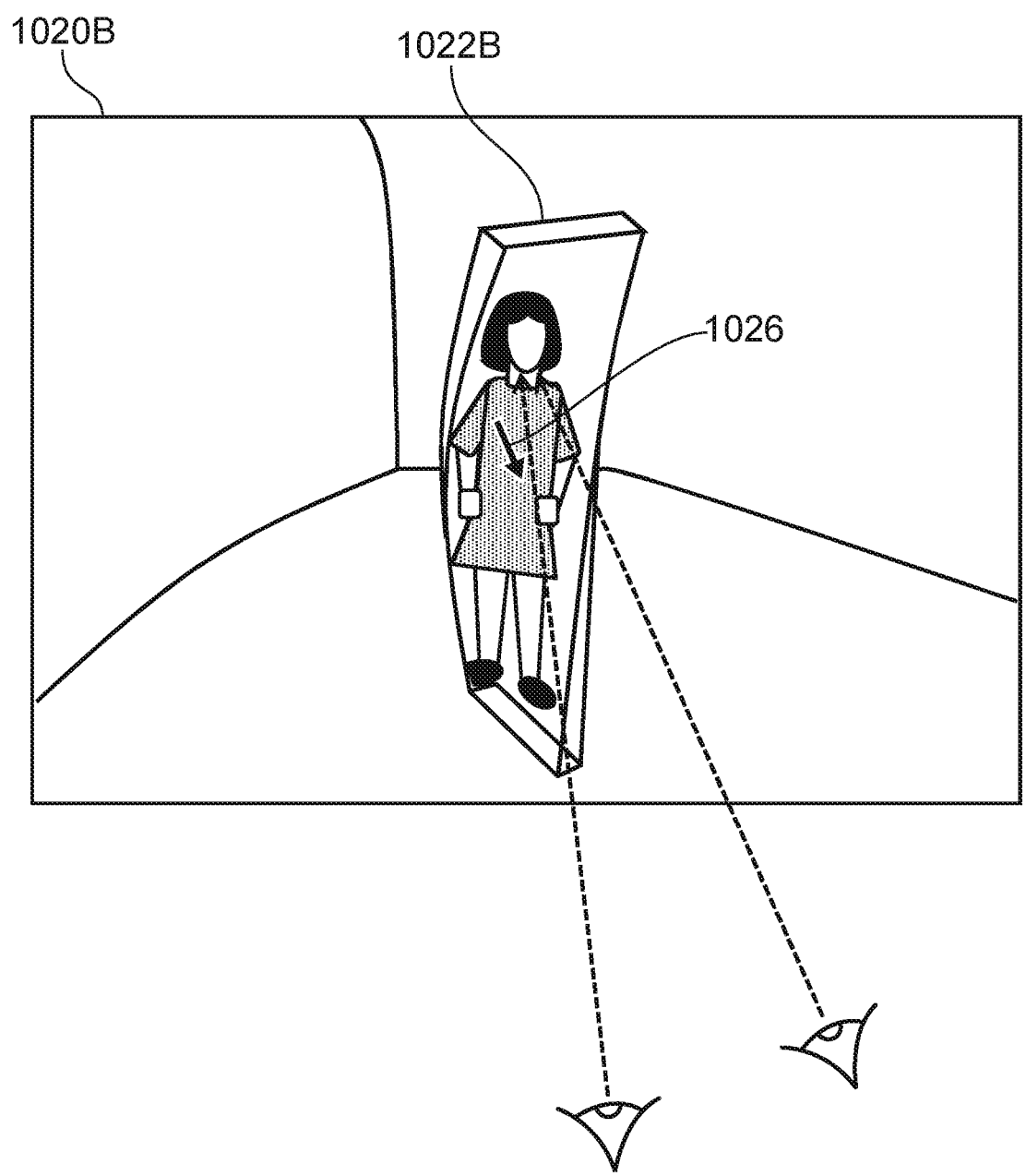
FIG. 31 schematically illustrates a virtual scene being viewed from a second viewpoint by the viewer.

FIG. 31 schematically shows an example of the virtual scene of FIG. 30, but viewed from a different viewpoint by the viewer. In FIG. 31, the viewer is still focussed on the performer but has changed their viewpoint of the performer. This change may have resulted from a change in pose of the viewer's head. For example, the viewer may be viewing the virtual scene via an HMD and may have moved so as to view the virtual scene from a different angle. In FIG. 31; this corresponds to the viewer having moved to a new position that is to the right of their previous position in FIG. 30. In FIG. 31, this change in position is reflected by the change in view of the virtual scene 1028.

In FIG. 31, it can be seen that the mesh onto which the stereoscopic image has been projected, has been twisted. In FIG. 31, this corresponds to a twisting of the mesh about a vertical axis such as an axis 1028 of FIG. 30. The twisting has resulted in the upper part of the stereoscopic image, in this case, the head and torso of the performer, being turned towards the viewer. The effect of this is that the viewer feels as if the performer is still directing their performance at the viewer, despite the viewer having changed their viewpoint. This may add to the viewer's feeling of presence within the performance, despite the virtual scene being a virtual representation of the actual performance. The degree of twisting may be limited based on the movement of the viewer. For example, it may be that the upper part of the mesh is restricted to turning no more than 60 degrees (in either direction, about a vertical axis) from a base position, so that the movement of the performance does not appear unnatural.

In FIG. 31 the upper part of the mesh is shown as having been twisted but the change in shape of the mesh need not be limited to just this. In some examples, the 3D shape of the mesh is changed such that the performer appears to maintain eye contact with the viewer. This may involve, for example, twisting an upper part of the mesh about a horizontal axis if e.g. the viewer moves from an upright position to a crouching or sitted position. In such a case, this would cause the performer to be looking down on (and at) the viewer. In other examples, the shape of the mesh may be changed such that the performer appears to trying to avoid eye contact with the viewer.

In yet additional or alternative examples, the mesh may be rotated based on the detected change in viewpoint of the viewer. For example, in FIG. 31, it may be that the mesh is rotated by an amount corresponding to the detected change in viewpoint of the viewer. In FIG. 31, this would result in the entirety of the performer's body being turned to face the viewer.

It will be appreciated here that the term 'twisting' refers to rotation of a portion of the mesh in three dimensions about one or more axes, relative to other portions of the mesh; whereas rotation refers to rotation of all of the mesh about an axis (i.e. a bulk rotation).

For example, twisting may involve rotating a portion of the mesh about one or more axes whilst other portions of the mesh are not rotated at all. This may be the case where e.g. only on the upper part of the mesh is rotated, and the lower parts of the mesh remain at their original position and orientation within the virtual scene. Alternatively or in addition, it may be that a first portion of the mesh is rotated in one direction (e.g. anti-clockwise, for example when viewed from above 1030) whilst another portion is rotated in a different direction (e.g. clockwise 1032). Generally, twisting a portion of the mesh results in a normal vector 1026 located at the surface of that portion being pointed in a different direction relative to normal vectors located at other points on the surface of the mesh. In some examples, the twisting may result in the normal vector 1026 at the twisted portion being rotated to face, or be closer to facing, the vector defining the viewer's overall gaze direction. An example of this is shown in FIG. 31.

Generally, the shape of the VDS is changed based on the detected change in viewpoint of the stereoscopic image, by the viewer. In some examples, a virtual scene may include a plurality of VDSs with each of these having a stereoscopic image of an object projected thereon. In these examples, the object that a viewer is viewing may be detected, and the VDS associated with that object may be rotated and/or twisted, based on a detected change in viewpoint of the same object, by the viewer. The object that a user is looking at may be determined based e.g. on the pose of a HMD that viewer is wearing and/or on the gaze direction of the viewer.

In an embodiment in which objects are presented using a flat VDS, it is usually considered that the display of the objects may be compromised as a result of mapping a curved (or otherwise non-planar) surface onto a flat surface. However, this may be mitigated in the present arrangement using a depth map that describes the depth of an object relative to the VDS. Objects may be defined to be in front of or behind the VDS relative to the viewer, with a value indicating how far away from the VDS the object is, whilst still being projected onto the VDS.

When the viewpoint within a virtual scene moves, objects may have a relative motion applied to them that is dependent upon the value defining the depth relative to the VDS. For example, an object that is in front of the VDS may move in the opposite direction to the viewpoint whilst objects behind the VDS may move in the same direction as the viewpoint. The magnitude of this motion may be proportional to the depth difference between the VDS and the object that is defined in the depth map.

In some embodiments, the depth map uses a 0-255 register for each object (or other element within the image, such as a particular area of the image) to describe the depth relative to the VDS. A value of 127 indicates that an object is at the same depth as the VDS, while values of 0 and 255 indicate a maximum distance in front of/behind the VDS respectively. This maximum distance may be defined for each scene individually; for example, the maximum distance in front could indicate being at the position of the viewpoint in the scene with an equal maximum distance behind, with the intermediate depths being scaled accordingly. Alternatively, a maximum distance from a VDS may be defined as a number of arbitrary units within the scene or as a percentage of the depth range of the whole scene. In such an embodiment, the depth map may be encoded in the alpha channel of the transmitted content or may be provided as separate metadata for a scene.

It may be advantageous, particularly in more complex scenes comprising a larger number of objects, that the virtual scene is provided in a layered manner. For example, a plurality of images could be captured of different viewpoints within a scene so as to record sufficient information about the depth of objects within a scene. FIG. 30 schematically illustrates a room that is divided into a plurality of depth layers used to describe different depths.

The centre of the room is denoted by a filled circle, which corresponds to the position of a viewpoint (for rendering or capturing an image) with objects A, B, C and D arranged within the room 940. Each of the circles represents a depth layer boundary, so as to allow a distinction between different depth regions within a virtual environment.

Figure 32:
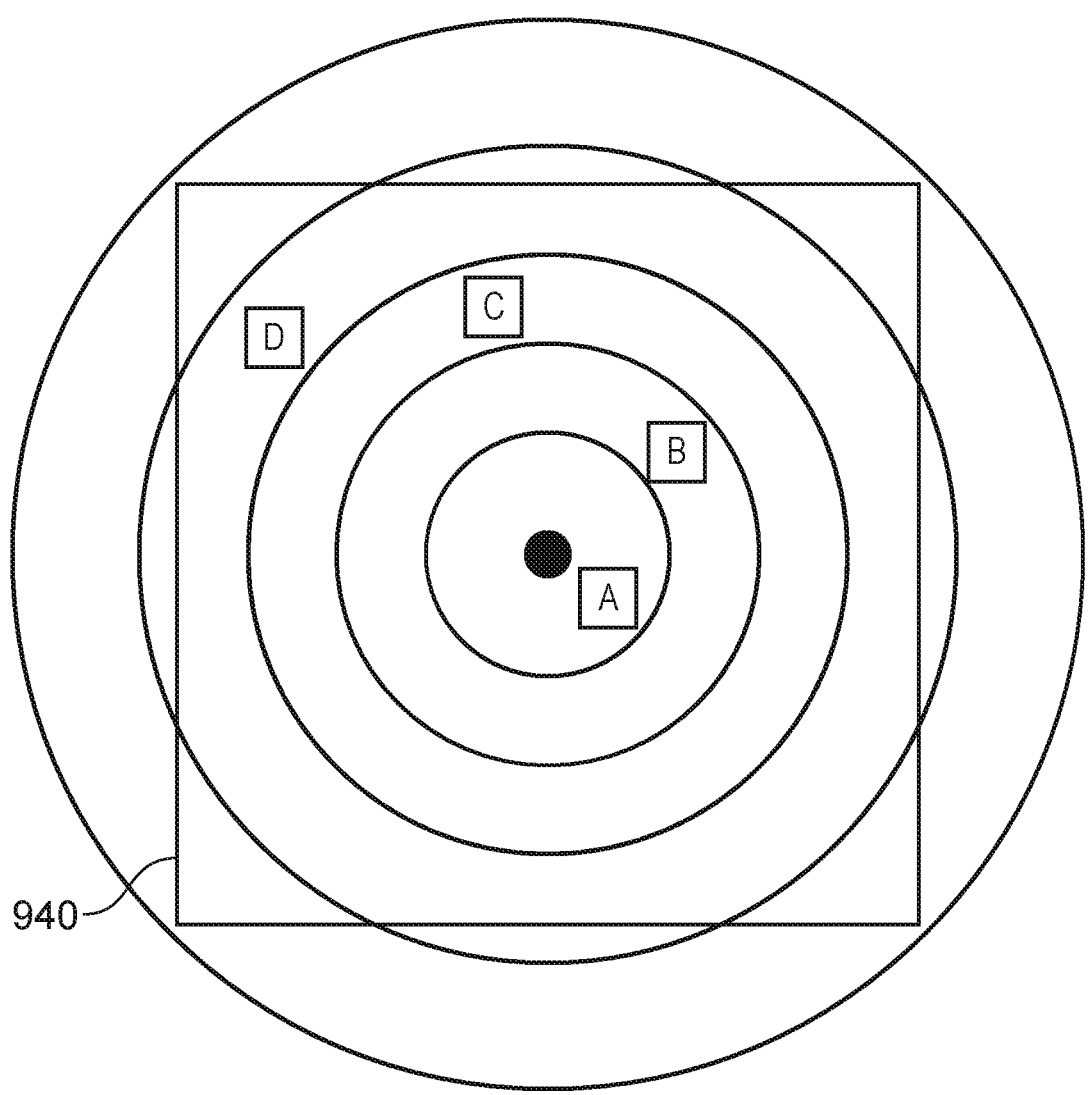
FIG. 32 schematically illustrates a plan view of a virtual environment.

Object A appears in the first depth layer, which is the same depth layer as the central viewpoint. Object B appears in the second depth layer (arranged so as to surround the first depth layer), object C appears in the third depth layer and object D appears in the fourth depth layer. The layers shown in FIG. 32 are labelled such that a higher number corresponds to an increase in distance from the centre of the environment.

It is apparent that the outermost depth layer extends beyond the perimeter of the room; the information in this layer would therefore not include any information for the regions which are obscured by the walls of the room (as these regions are not visible from any angle) and instead would comprise a series of discrete areas (corresponding to the corners of the room).

Each of these depth layers may be rendered separately, in any order. For example, a painter's algorithm could be used to as to render the scene starting from the outermost depth layer and moving towards the centre of the scene.

While shown to be completely distinct, in some embodiments the layers may overlap in the depth direction. This means that multiple images are captured of each object in the environment, and this may be utilised to generate more accurate depth data than in an arrangement in which only a single image is captured of each object.

While the above discussion has been provided with reference to VDSs that are stationary, in some embodiments it is advantageous for content to be provided using dynamic VDSs. For example, a mesh that represents a person in a video may be controlled to move so as to follow the motion of the person within the video. This ensures that the correct display of an object may be maintained over several frames, rather than the motion of the person causing a separation between the person in the image and the VDS to which the image of the person was initially mapped.

The VDSs as described above may be suitable for use with any projection type for the content as a whole. For example, a cubic projection may be used, with VDSs defined relative to this. An equirectangular projection mapping may be a particularly advantageous projection to use in conjunction with the VDSs, as this is a projection which most closely matches the geometry generated when capturing content as a 360 degree panoramic. As a result of this, the number of display errors may be reduced.

Figure 33:
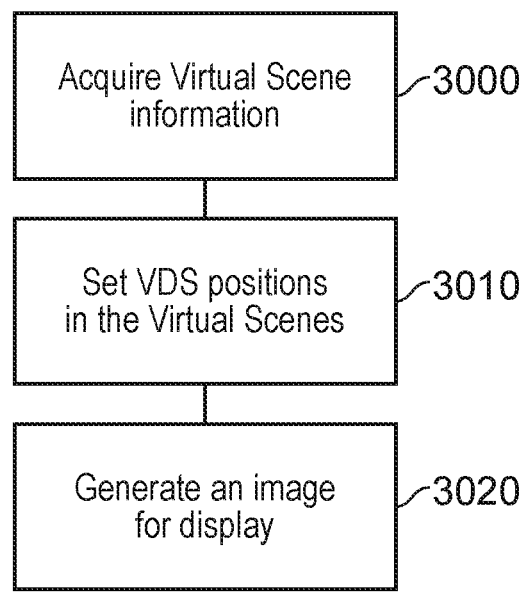
FIG. 33 schematically illustrates an image generation method.

FIG. 33 schematically illustrates an image generation method.

A step 3300 comprises acquiring virtual scene information. This comprises obtaining mesh and texture information required to generate an image of a virtual scene for display, for example, or any other form of image data that may be used to generate an image for display representing at least a portion of a virtual environment. This information may be obtained from any suitable source; for example, a removable storage medium or the internet.

A step 3310 comprises setting the position of the VDS in the virtual scene, in dependence upon the position of objects to be displayed within the virtual scene. The setting of a VDS position for a stereoscopic image for display is performed such that the depth profile of one or more VDSs approximates the depth profile of one or more objects in a virtual scene to be displayed by that stereoscopic image.

A step 3320 comprises generating an image for display. This image is generated so as to have an image parallax appropriate to the VDS position or positions set by the setting step 3330.

Figure 34:
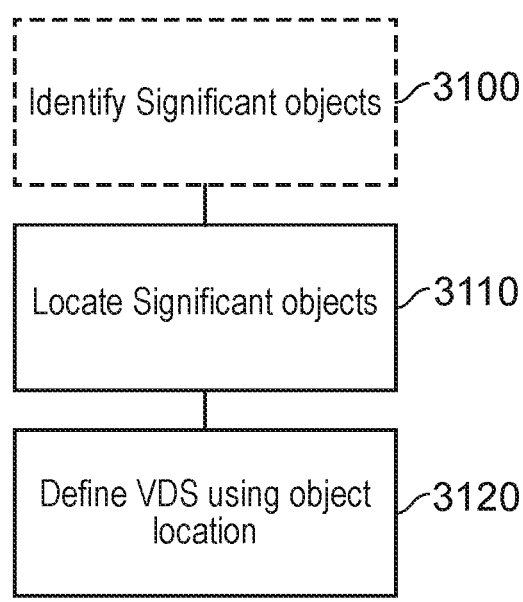
FIGS. 34 and 35 schematically illustrate VDS setting methods.
Figure 35:
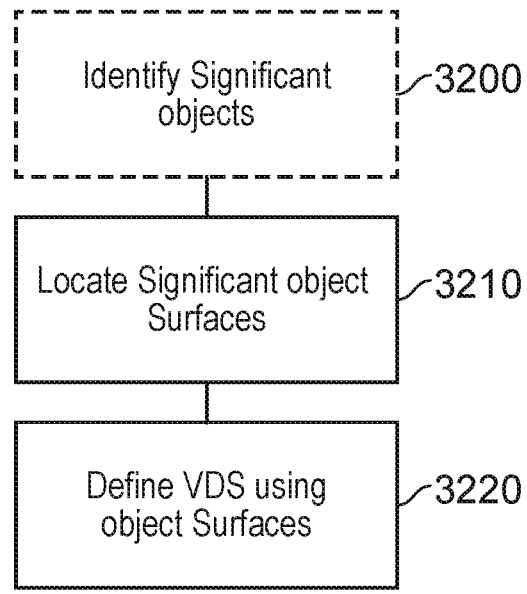

FIGS. 34 and 35 schematically illustrate examples of methods for setting the VDS position in the virtual scene in accordance with step 3310 of FIG. 33.

FIG. 34 corresponds to a method in which a VDS is defined at the position of different objects within the scene.

A step 3400 comprises the identification of significant objects within the virtual scene. A significant object is one that is to be considered when generating the VDS; for example, objects that are important to a story may be considered in preference to background objects such as scenery.

In some embodiments, only one of two identical objects may be significant if it is only determined that the VDS should be generated in dependence upon one of the two identical objects. Significant objects may be recognised in any of a number of ways.

In some embodiments, a significant object is identified in metadata associated with the virtual scene or video/image content. Alternatively, or in addition, processing may be performed so as to identify the objects of interest; this could take the form of motion detection (as objects that move more in scenes often are more important) or colour detection (as important objects tend to be of a different colour to the background, to ensure visibility). A further alternative or additional method is to allow a user to identify objects of significance manually.

In some embodiments, the significant objects may be determined or defined with a degree of significance or some other manner of distinguishing between the significant objects in dependence upon their significance. This may be advantageous in that in systems with limited processing power or the like, only the most significant objects may have a corresponding VDS that is defined. In the context of the above examples, a significance may be defined in the associated metadata or objects may be assessed to be of different levels of significance based upon amount of motion, speed of motion, object size, the severity of difference in colour (such that a red object on a green background is seen as more significant than an object that is a different shade of green would be, for example), or using any other suitable indicator of potential significance.

Of course, this step may be omitted entirely; in some arrangements, there may be no distinction between significant and insignificant objects such that a VDS is generated for each object within a scene. In this case, the steps below are performed for each object rather than only significant objects.

A step 3410 comprises locating the significant objects; this may be in the virtual environment in which they are present, their location in the image frame that is to be displayed, or simply relative to one another for example. This may be performed by using a depth map, for example, or by reading out such information from metadata associated with the content.

A step 3420 comprises defining one or more VDSs using the location of the significant objects. As described above, this may comprise the definition of a VDS shape and location in the virtual scene. In some embodiments, information about the object (such as a shape and size) is used in order to define a VDS that is approximately at the surface of the object. In some other embodiments, a VDS is defined using the position of the object only; this may mean that the VDS intersects the object.

FIG. 35 relates to an embodiment in which the surfaces of objects are located, rather than the location of the object itself. This may be advantageous in that a step of identifying an appropriate VDS based upon the position of the object may be omitted, as this step (as described above) comprises discarding the actual object position and thus may be seen as inefficient.

A step 3500 comprises identifying significant objects, in a manner similar to the step 3400 of FIG. 34.

A step 3510 comprises locating object surfaces for the identified significant objects. As in step 3410 of FIG. 34, this may be performed using metadata associated with the virtual scene or object, or by image recognition or use of a depth map. For example, an object may be identified as having a particular position in a scene, and then edge detection may be used to identify the object boundaries. By consulting a depth map for the area within the boundary, a depth profile of the object may be obtained.

A step 3520 comprises defining a VDS in dependence upon the surface information that is acquired in step 3510. This may be performed by simply defining the VDS to be the same as the surface information, or a simplified VDS may be defined (for example, by approximating the surface information with a simplified function) so as to reduce computational complexity. The VDS may be defined as a mathematical function, or by defining a depth for the VDS at each point or each of a plurality of small areas (such that a number of tiles may make up the VDS) that each approximate a corresponding area of the surface.

Figure 36:
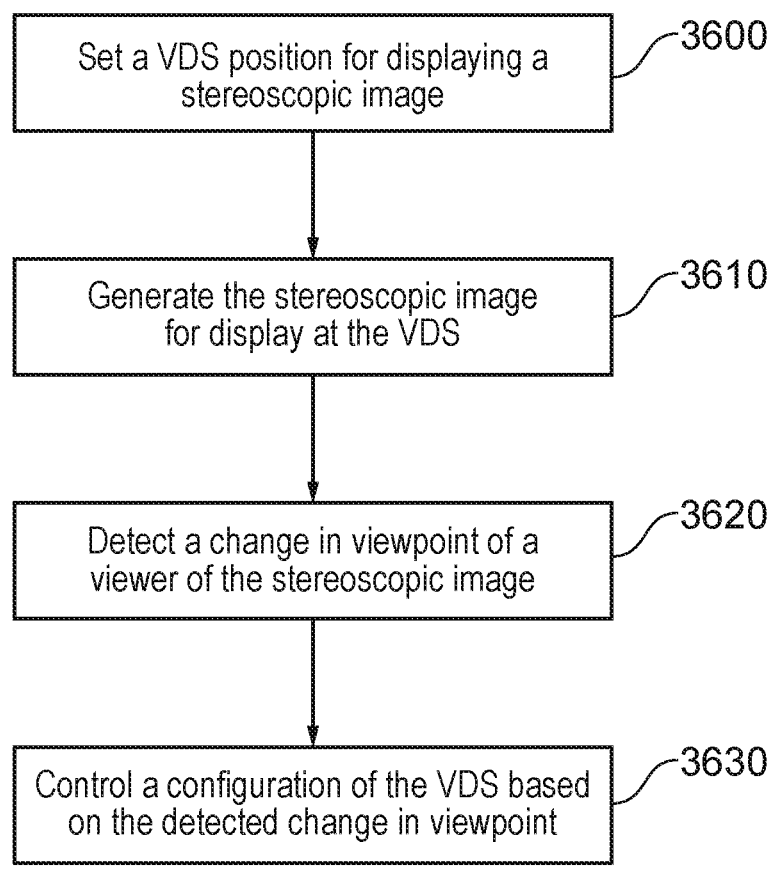
FIG. 36 schematically illustrates a VDS shape modification method.

FIG. 36 illustrates an image generation method in accordance with the present disclosure.

At step 3600 a VDS position for displaying a stereoscopic image is set. The setting of the position of the VDS may be set according to any of techniques described previously.

At step 3610 a stereoscopic image for display at the VDS is generated. As described previously in relation to FIG. 29, the stereoscopic image may be a live-action video of a performer. The stereoscopic image is projected onto the VDS, within the virtual scene. The virtual scene may be e.g. a 3D reconstruction of a real, physical environment, with the VDS being superposed on top of (or blended with) 3D reconstruction of that environment. The VDS may have a shape defined by a three-dimensional mesh and the stereoscopic image may form a texture that is projected onto this mesh.

At step 3620 a change in viewpoint of the viewer of the stereoscopic image is detected. If the viewer is wearing an HMD, this change in viewpoint may be detected based on a change in pose of the HMD. For example, it may generally be assumed that the user will be looking at a central region of the display element of the HMD, and so the change in viewpoint of the corresponding virtual scene can be inferred from a detected change in pose of the HMD. In other examples, this change in viewpoint may be detected without an HMD, e.g. by detecting a pose and/or gaze direction of a viewer, e.g. using one or more cameras to capture images of the viewer's eyes.

At step 3630 a configuration of the VDS is controlled, based on the detected change in viewpoint of the viewer of the stereoscopic image. The shape of the VDS may be defined by a three-dimensional mesh. The configuration of the VDS may be controlled by controlling a rotation of the mesh, for example. Alternatively or in addition, the configuration of the VDS may be controlled by twisting a portion of the mesh. The twisting may correspond to rotating a portion of the mesh towards the viewer. The twisting may be such that a surface normal at the twisted portion of the mesh is rotated towards the viewer.

The rotation and/or twisting of the mesh may result in a corresponding rotation and/or twisting of the stereoscopic image that is projected onto the mesh In one example, the upper part of the mesh may be twisted such that at least one the head and shoulders of a human in the stereoscopic image is turned towards the viewer. In this way, the human in the stereoscopic image may appear to remain facing the viewer, despite the viewing having changed their viewpoint of the stereoscopic image. As mentioned previously, the stereoscopic image may be a live-action video of a performer (not live as in being captured in real-time, but live as in the video is of a real person performing).

In some examples, the stereoscopic image may comprise a first object and a second object. The first object may be e.g. a human and the second object may be e.g. an instrument or a physical surface such as the floor that the human is contact with. In such examples, the VDS may be shaped so as to conform to the shape of the first object at the point of contact between the first object and the second object. As mentioned previously, this shaping of the VDS ensures that the first object does not appear to float relative to the second object, which may appear unnatural. The shape of the VDS may be substantially flat (for example, perpendicular to a direction from the viewer) at the regions of the stereoscopic image in which the first object is not in contact with the second object.

It will be appreciated that while the method described in relation FIG. 36 has been described in relation to one stereoscopic image, in some examples, the virtual scene may comprise a plurality of VDSs, with each VDS being used to display a (different) respective stereoscopic image of at least one object in the virtual scene. In these examples, the pose of the viewer's head and/or gaze direction of the viewer are tracked and used to determine which of the VDSs (and therefore stereoscopic images) that the viewer is viewing. In preferred embodiments, this is achieved using an HMD, i.e. detecting by detecting a change in pose of the HMD and/or by detecting a change in gaze direction of the wearer of the HMD (e.g. using an infra-red camera within the HMD). Once the stereoscopic image that the viewer is looking at has been detected, the configuration of the VDS associated with that stereoscopic image may be controlled, as described above in relation to step 3630.

It will be further be appreciated that, while the change in configuration has been described in relation to a mesh, the change may correspond to a change in shape of any surface onto which the stereoscopic image(s) is (or are) projected. Moreover, the change in configuration need not be limited to a rotation or twisting operation, but may more generally involve controlling a three-dimensional shape of the mesh.

Figure 37:
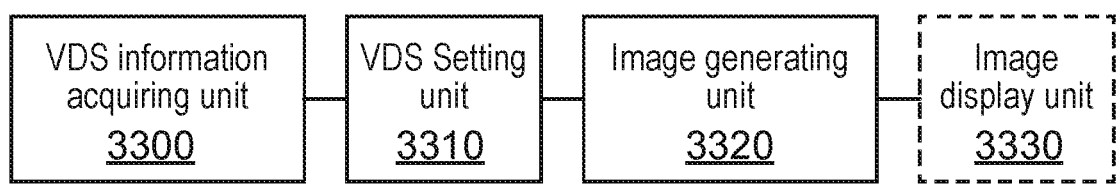
FIG. 37 schematically illustrates an image generation apparatus.

FIG. 37 schematically illustrates an image generation system. This comprises a virtual scene information acquiring unit or circuitry 3700, a VDS setting unit or circuitry 3710, an image generation unit or circuitry 3720. Optionally, an image display unit or circuitry 3730 may be provided for displaying the generated images.

The virtual scene information acquiring unit 3700 is operable to acquire information about a virtual scene. This may be acquired in the form of mesh and texture data for a virtual scene, information from metadata associated with a virtual scene or image content, or information derived by performing some form of image analysis on an image (or images) for display, for example.

The VDS setting unit 3710 is operable to set the position of one or more VDSs for a virtual scene. This may include defining a particular shape, so as to approximate (or replicate) the surface of an object in the scene, for example.

The image generating unit 3720 is operable to generate a image for display in dependence upon the one or more VDSs that are set by the VDS setting unit 3710. For example, this may comprise using mesh and texture information about a virtual scene in conjunction with the information about the one or more VDSs to generate an image for display.

The image display unit 3730 may be an HMD or any other hardware capable of displaying 3D content to a viewer.

Figure 38:
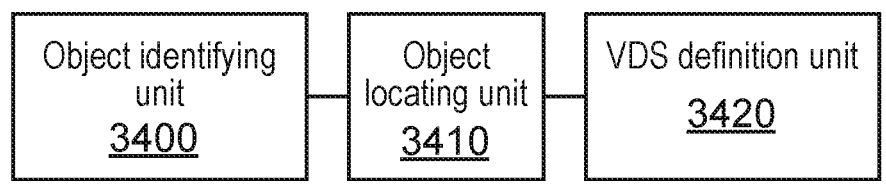
FIG. 38 schematically illustrates a VDS setting apparatus.

FIG. 38 schematically illustrates the VDS setting unit 3710. The VDS setting unit 3710 may comprise an object identification unit 3800, an object locating unit 3810 and a VDS definition unit 3820.

The object identification unit 3800 is operable to identify which objects are to have an associated VDS defined. As discussed above, this may comprise identifying significant objects in a scene based upon metadata or image/scene analysis methods.

The object locating unit 3810 is operable to locate one or more of the objects that are identified by the object identification unit 3800. In some embodiments, each of the identified objects are located, while in others only a portion of the objects may be located (for example, to reduce a processing burden on the image generating device). The object locating unit 3810 may be operable to derive the location of objects based upon image processing techniques, user input, associated metadata, or any other suitable method. In some embodiments, the object is located while in others it is the surface of the object that is located.

The VDS defining unit 3820 is operable to define a VDS in dependence upon the location of the identified objects. As noted above, this may comprise setting one or more VDSs that intersect one or more of the one or more identified objects, or setting the one or more VDSs that approximate (or replicate) the surfaces of the identified objects.

Figure 39:
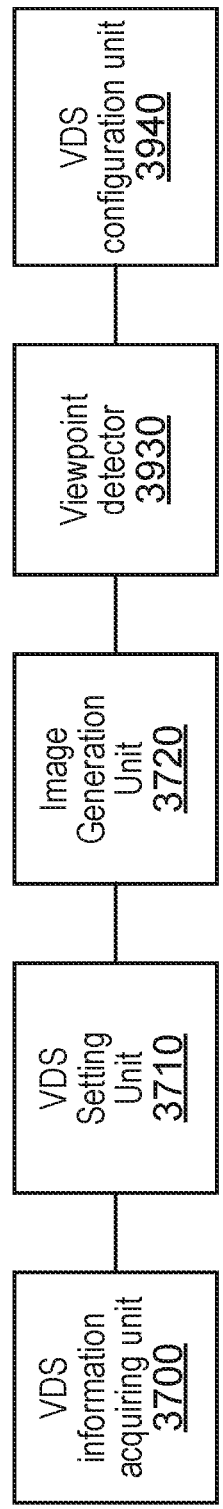
FIG. 39 schematically illustrates a VDS image generation system.

FIG. 39 schematically illustrates a further image generation system in accordance with the present disclosure. The image generation system of FIG. 39 comprises the virtual scene information acquiring unit 3700, VDS Setting Unit 3710 and Image Generation Unit 3720 described previously. The image generation system further comprises a viewpoint detector 3930 and VDS shape unit 3940.

The viewpoint detector 3930 is configured to detect a change in viewpoint of a viewer of a stereoscopic image generated by the image generation unit. The viewpoint detector 3930 may be configured to detect at least one of a pose of the viewer's head and a gaze direction of the viewer. In some examples, the viewpoint detector may be configured to detect the change in viewpoint based on a change in pose of an HMD that the viewer is wearing to view the virtual scene (which itself comprises the VDS onto which the stereoscopic image is projected). The change in pose of the HMD may be detected using the motion detectors described previously. Changes in the gaze of the viewer may be detected using e.g. one or more cameras, such as infra-red cameras, within the HMD.

The VDS configuration unit is operable to modify a configuration of a VDS, in response to the detected change in viewpoint of the object being displayed by that VDS. In some examples, the VDS may comprise a mesh and the configuration of the VDS may be modified by rotating and/or twisting the mesh. The VDS configuration unit may be operable to determine a rotation and/or twisting of the mesh that results in a portion of the stereoscopic image continuing to face the viewer, at the viewer's new viewpoint. Moreover, the VDS configuration unit may also be operable to control a deformation of the mesh, in addition to a rotation or twisting (i.e by controlling an overall 3D shape of the mesh and not just a complete or partial rotation thereof). In some examples, the stereoscopic image may be a live-action video of a performer and the VDS configure unit may be operable to twist an upper part of the corresponding mesh. As described above, this twisting may be such that the head of the performer remains facing (i.e. looking at) the viewer. Whilst the above examples have been described in relation to a human performer, it will be appreciated that the stereoscopic image may be a live-action video of any animated object.

FIG. 40 schematically illustrates a stereoscopic video signal 4000. The stereoscopic video signal comprises associated metadata defining a virtual display screen (VDS) position for use in respect of subsets of frames of the stereoscopic video signal, the VDS position for a frame having depth profile that approximates the depth profile of objects to be displayed by that frame.

The video signal comprises stereoscopic video content 4010, VDS position information 4520, VDS depth profile information 4030, shape modification information 404 and an additional metadata field 4050.

The stereoscopic video content 4010 comprises information that may be displayed to a viewer of a display device. For example, this may comprises pre-rendered images, or mesh and texture information.

The VDS position information 4020 defines the location of one or more VDSs in the scene represented by the stereoscopic video content 4010. This may comprise coordinates within the scene, for example, or an identification of which pixels correspond to the screen. Of course, any suitable method for defining the location may be used, such as linking the location of the VDS to that of an object within the scene.

The VDS depth profile information 4030 comprises information about the depth profile of the one or more VDSs. The depth profile of a VDS is a description of the shape of the VDS; for example, the depth profile may be a surface that is defined at a position corresponding to the VDS position information 4020. As described above, a depth profile may be defined using any suitable method rather than being limited to a function defining a surface or the like.

The VDS configuration information 4040 comprises information defining change information in respect of the configuration of at least one of the VDSs. The change in configuration of the at least one VDS is defined such that the change in configuration depends on a detected change in viewpoint of the object displayed by the at least one VDS. In some examples, the change in configuration corresponds to a rotating and/or twisting of a mesh. The rotation and/or twisting of the mesh may be defined such that at least part of the mesh is turned towards or to face the viewer, at the viewer's new respective viewpoint.

The additional metadata field 4050 may comprise any additional information that is useful for defining the one or more VDSs. For example, a list of object IDs could be provided so as to associate a VDS with an object in the scene represented by the stereoscopic video content 4010. Alternatively, or in addition, information about the motion of a VDS may be provided in this field 4040.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The invention claimed is:

1. A method of generating stereoscopic images for display with respect to a virtual display screen (VDS), the method comprising the steps of:

setting a VDS position for displaying a stereoscopic image of an object in a virtual scene, the VDS having a depth profile that approximates a depth profile of the object;
generating the stereoscopic image for display at the VDS within the virtual scene;
detecting a change in viewpoint of a viewer of the stereoscopic image; and
controlling a configuration of the VDS based on the detected change in viewpoint of the stereoscopic image by the viewer, wherein:
the VDS has a shape defined by a three-dimensional mesh, and
the controlling the configuration of the VDS comprises rotating the mesh such that the VDS is turned towards the viewer.

2. A method according to claim 1, wherein the step of controlling the configuration of the VDS comprises twisting the mesh such that a portion of the mesh is rotated towards the viewer.

3. A method according to claim 2, wherein the at least one object in the stereoscopic image comprises a human; and wherein the step of controlling the configuration of the VDS comprises twisting an upper part of the mesh such that at least one of the head and shoulders of the human is turned towards the viewer.

4. A method according to claim 3, wherein the stereoscopic image comprises a live-action video of a performer.

5. A method according to claim 1, further comprising generating the virtual scene for display at a head-mountable display (HMD); and wherein detecting a change in viewpoint of the viewer of the stereoscopic image comprises detecting a change in pose of the HMD.

6. A method according to claim 1, wherein the stereoscopic image comprises a second object; and wherein the VDS is shaped so as to conform to the shape of the first object at the point of contact between the first object and the second object in the stereoscopic image.

7. A method according to claim 6, wherein the shape of the VDS is substantially flat at the regions of the stereoscopic image in which the first object is not in contact with the second object.

8. A method according to claim 1, wherein the virtual scene comprises a three-dimensional reconstruction of an environment and the stereoscopic image is projected onto the VDS within the three-dimensional reconstruction of the environment.

9. A method according to claim 1, further comprising:
setting a VDS position for a plurality of VDSs, the depth profile of each VDS approximating a depth profile of a respective object in the virtual scene, each VDS being arranged to display a different stereoscopic image;
generating the stereoscopic images for display as part of the virtual scene;
detecting one of the stereoscopic images as being viewed by a viewer;
detecting a change in viewpoint of that stereoscopic image by the viewer; and
wherein the step of controlling the configuration of the VDS comprises controlling the configuration of the VDS associated with the stereoscopic image detected as being viewed by the viewer.

10. A method according to claim 9, wherein detecting one of the stereoscopic images as being viewed by the user comprises detecting at least one of:
a gaze direction of the viewer; and
a pose of the viewer's head.

11. A non-transitory, computer readable storage medium containing computer software which, when executed by a computer, causes the computer to generate stereoscopic images for display with respect to a virtual display screen (VDS), by carrying out actions comprising:
setting a VDS position for displaying a stereoscopic image of an object in a virtual scene, the VDS having a depth profile that approximates a depth profile of the object;
generating the stereoscopic image for display at the VDS within the virtual scene;
detecting a change in viewpoint of a viewer of the stereoscopic image; and
controlling a configuration of the VDS based on the detected change in viewpoint of the stereoscopic image by the viewer, wherein:
the VDS has a shape defined by a three-dimensional mesh, and
the controlling the configuration of the VDS comprises rotating the mesh such that the VDS is turned towards the viewer.

12. An image generation system for generating stereoscopic images for display with respect to a virtual display screen (VDS) position, the system comprising:
a VDS setting unit configured to set the VDS position for a stereoscopic image such that a depth profile of the VDS approximates a depth profile of an object to be displayed in that stereoscopic image;
an image generation unit operable to generate the stereoscopic image for display as part of a virtual scene, the stereoscopic image being displayed at the VDS within the virtual scene;
a viewpoint detector configured to detect a change in a viewer's viewpoint of the stereoscopic image; and
a VDS configuration unit operable to modify a configuration of the VDS based on a detected change in the viewer's viewpoint of the stereoscopic image, wherein:
the VDS has a shape defined by a three-dimensional mesh, and
the VDS configuration unit operates to control the configuration of the VDS by rotating the mesh such that the VDS is turned towards the viewer.

13. A system according to claim 12, wherein the VDS has a shape defined by a three-dimensional mesh; and wherein the VDS configuration unit is operable to modify the configuration of the mesh such that at least a portion of the VDS is turned towards the viewer, at the viewer's new viewpoint.

14. A system according to claim 12, comprising a head-mountable display (HMD) operable to display the virtual scene comprising the stereoscopic image.

15. A system according to claim 12, wherein the system produces a stereoscopic video signal having associated metadata defining a change in configuration of a virtual display screen (VDS) for use in respect of subsets of frames of the stereoscopic video signal, the change in configuration for a frame being defined such that the change in configuration corresponds to a detected change in viewpoint of a viewer of an object within that frame.

* * * * *